US010945180B2

United States Patent
Jin

(10) Patent No.: US 10,945,180 B2
(45) Date of Patent: Mar. 9, 2021

(54) MOBILITY MANAGEMENT METHOD, APPARATUS, AND SYSTEM

(71) Applicant: HUAWEI TECHNOLOGIES CO., LTD., Shenzhen (CN)

(72) Inventor: Weisheng Jin, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 284 days.

(21) Appl. No.: 16/114,738

(22) Filed: Aug. 28, 2018

(65) Prior Publication Data

US 2018/0368042 A1 Dec. 20, 2018

Related U.S. Application Data

(63) Continuation of application No. PCT/CN2016/074837, filed on Feb. 29, 2016.

(51) Int. Cl.
*H04W 36/28* (2009.01)
*H04W 8/08* (2009.01)
(Continued)

(52) U.S. Cl.
CPC ............ *H04W 36/28* (2013.01); *H04W 8/08* (2013.01); *H04W 8/14* (2013.01); *H04W 8/26* (2013.01);
(Continued)

(58) Field of Classification Search
CPC ..... H04W 36/28; H04W 76/15; H04W 76/32; H04W 8/08; H04W 8/14; H04W 8/26;
(Continued)

(56) References Cited

U.S. PATENT DOCUMENTS 8,031,671 B2 * 10/2011 Harper ................... H04W 8/26
370/331
8,483,174 B2 * 7/2013 Ahmavaara ......... H04W 36/125
370/331
(Continued)

FOREIGN PATENT DOCUMENTS

CN 101128022 A 2/2008
CN 103517264 A 1/2014
(Continued)

OTHER PUBLICATIONS

Office Action, dated Sep. 4, 2018, in Chinese Application No. 201480033896.1 (11 pp.).
(Continued)

*Primary Examiner* — Chi H Pham
*Assistant Examiner* — Weibin Huang
(74) *Attorney, Agent, or Firm* — Kilpatrick Townsend & Stockton LLP

(57) ABSTRACT

Embodiments of the present invention relate to field of communications technologies, and provide a mobility management method that can effectively ensure normal communication between user equipment and a base station without using an anchor device, and ensure service continuity between the user equipment and a communication peer. A specific solution is as follows: User equipment establishes a first substream with a communication peer; when the user equipment moves from a first base station to a second base station, and a second gateway and a first gateway are not the same gateway, the user equipment obtains a second IP address; after obtaining the second IP address, the user equipment establishes a second substream with the communication peer; after the second substream is established, the communication peer removes the first substream; and after the first substream is removed, the first gateway releases a (Continued)

network resource occupied for transmitting the first substream.

18 Claims, 6 Drawing Sheets

(51) Int. Cl.
| | |
|---|---|
| *H04W 76/15* | (2018.01) |
| *H04W 76/32* | (2018.01) |
| *H04W 8/14* | (2009.01) |
| *H04W 8/26* | (2009.01) |
| *H04W 36/00* | (2009.01) |
| *H04W 36/08* | (2009.01) |
| *H04W 36/18* | (2009.01) |
| *H04W 36/32* | (2009.01) |
| *H04W 88/16* | (2009.01) |

(52) U.S. Cl.
CPC ........ *H04W 36/0011* (2013.01); *H04W 36/08* (2013.01); *H04W 36/18* (2013.01); *H04W 36/32* (2013.01); *H04W 76/15* (2018.02); *H04W 76/32* (2018.02); *H04W 88/16* (2013.01)

(58) Field of Classification Search
CPC . H04W 36/0011; H04W 36/08; H04W 36/18; H04W 36/32
See application file for complete search history.

(56) References Cited

U.S. PATENT DOCUMENTS

| | | | | |
|---|---|---|---|---|
| 2004/0032844 | A1* | 2/2004 | Lewis | H04W 8/12 370/338 |
| 2005/0025132 | A1 | 2/2005 | Harper et al. | |
| 2008/0259873 | A1 | 10/2008 | Ahmavaara et al. | |
| 2010/0297998 | A1* | 11/2010 | Hapsari | H04W 36/0072 455/438 |
| 2012/0258674 | A1 | 10/2012 | Livet et al. | |
| 2013/0097329 | A1 | 4/2013 | Alex et al. | |
| 2013/0336287 | A1* | 12/2013 | Abraham | H04W 36/0066 370/331 |
| 2014/0242962 | A1 | 8/2014 | Choi et al. | |
| 2014/0307573 | A1* | 10/2014 | Park | H04W 76/12 370/252 |
| 2015/0103804 | A1 | 4/2015 | Gao et al. | |
| 2015/0223284 | A1 | 8/2015 | Jain et al. | |
| 2015/0304892 | A1* | 10/2015 | Perras | H04L 61/2007 370/331 |
| 2016/0255540 | A1 | 9/2016 | Kweon et al. | |
| 2016/0286441 | A1* | 9/2016 | Kweon | H04W 36/0066 |
| 2016/0309540 | A1* | 10/2016 | Zhang | H04L 61/2076 |
| 2017/0171903 | A1* | 6/2017 | Kubota | H04W 76/19 |
| 2017/0238215 | A1 | 8/2017 | Jin | |
| 2018/0368042 | A1* | 12/2018 | Jin | H04W 8/26 |
| 2019/0014508 | A1* | 1/2019 | Eriksson | H04L 61/256 |

FOREIGN PATENT DOCUMENTS

| | | | |
|---|---|---|---|
| EP | 2214360 | A1 | 8/2010 |
| EP | 2665308 | A1 | 11/2013 |
| EP | 3209043 | A1 | 8/2017 |
| WO | 2009067494 | A1 | 5/2009 |
| WO | 2011085618 | A1 | 7/2011 |
| WO | 2016070333 | A1 | 5/2016 |

OTHER PUBLICATIONS

U.S. Appl. No. 15/586,151, filed May 3, 2017, Weisheng Jin, Huawei Technologies Co., Ltd.
SP-140861, Samsung et al., "On Prioritization of FS_CSIPTO_St2," 3GPP TSG SA Meeting #66, Maui, US; Dec. 10-12, 2014 (10 pp.).
SP-140840, Samsung et al., "On Prioritization of FS_CSIPTO_St2," 3GPP TSG SA Meeting #66, Maui, US; Dec. 10-12, 2014 (10 pp.).
3GPP TR 22.828 V13.0.0 (Jun. 2014), 3rd Generation Partnership Project; Technical Specification Group Services and System Aspects; Study on co-ordinated Packet data network GateWay (PGW) Change for Selected IP Traffic Offload (CSIPTO) (Release 13), pp. 1-18.
3GPP TS 22.101 V14.1.0 (Sep. 2015), 3rd Generation Partnership Project; Technical Specification Group Services and System Aspects; Service aspects; Service principles (Release 14), pp. 1-92.
Partial Supplementary European Search Report, dated Nov. 6, 2018, in European Application No. 16891945.4 (13 pp.).
International Search Report, dated Dec. 1, 2016, in International Application No. PCT/CN2016/074837 (4 pp.).
Written Opinion of the International Searching Authority, dated Dec. 1, 2016, in International Application No. PCT/CN2016/074837 (9 pp.).
International Search Report, dated Dec. 1, 2016, in International Application No. PCT/CN2016/074837 (6 pp.).
Office Action, dated Dec. 19, 2018, in U.S. Appl. No. 15/586,151 (36 pp.).

* cited by examiner

MOBILITY MANAGEMENT METHOD, APPARATUS, AND SYSTEM

CROSS-REFERENCE TO RELATED APPLICATIONS

This application is a continuation of International Application No. PCT/CN2016/074837, filed on Feb. 29, 2016, the disclosure of which is hereby incorporated by reference in its entirety.

TECHNICAL FIELD

The present disclosure relates to the field of communications technologies, and in particular, to a mobility management method, an apparatus, and a system.

BACKGROUND

With development of current communications technologies, various access technologies emerge, for example, a cellular network 2G/3G/4G access technology, a wireless local area network (WLAN) access technology, a fiber access technology, and a Bluetooth access technology. A plurality of access technologies may be integrated in a communications terminal. How to improve communication efficiency and user experience by using various access technologies in a communications terminal (such as a user terminal) is one of key technical issues currently.

Among technologies for implementing multipath access, a Multipath Transmission Control Protocol (MPTCP) technology is a developed technology that is relatively mature. MPTCP can distribute data packets for transmission between a user terminal and a network by using channels based on a plurality of access technologies. An MPTCP layer is added between a socket and a TCP layer in a Transmission Control Protocol (TCP)/Internet Protocol (IP) protocol stack architecture, and the MPTCP layer is responsible for managing a plurality of TCP submodules. Two communication parties may use different address pairs to establish TCP substream connections. The TCP substreams may be transmitted on a network of one or more access technologies. The MPTCP layer is responsible for selecting for a service data stream, and performing packet segmentation and assembly, route selection, and scheduling. The plurality of TCP substreams are associated and managed, so that data transmission is performed in the substreams in parallel. This improves bandwidth utilization and transmission performance. The socket and an application layer do not need to care about specific TCP substreams for transmitting the service data stream.

In a single access technology, for example, a cellular network, when one of two communication parties moves in the cellular network, if an IP address of the party changes, a TCP connection between the two communication parties is broken. Therefore, in the existing cellular network, to ensure continuity of a TCP-based service and avoid interruption of data transmission, an anchor device that keeps an IP address unchanged needs to be deployed. As intelligent terminals and mobile applications are rapidly popularized, accompanied with fast development of the mobile Internet, a mobile network tends to be deployed in a distributed manner. In addition, because of a large data volume in mobile Internet communication, an anchor device in data convergence mode in an original mobile network architecture has heavy workload. If the anchor device is faulty, normal running of a whole service network is affected.

SUMMARY

Embodiments of the present invention provide a mobility management method, an apparatus, and a system that can effectively ensure normal communication between user equipment and a base station without using an anchor device.

To achieve the foregoing objective, the following technical solutions are used in the embodiments of the present invention:

According to a first aspect, a mobility management system includes user equipment, a first base station, a second base station, a first gateway, a second gateway, and a communication peer, where the first base station is connected to the first gateway, and the second base station is connected to the second gateway, where the user equipment is configured to establish a first substream with the communication peer, where the first substream is a substream established by the user equipment with the communication peer by using a first Internet Protocol IP address, and the first IP address is an IP address allocated by the first gateway to the user equipment;

when the user equipment moves from the first base station to the second base station, the user equipment is further configured to obtain a second IP address when the second gateway and the first gateway are not the same gateway, where the second IP address is an IP address allocated by the second gateway to the user equipment;

the user equipment is further configured to establish a second substream with the communication peer after obtaining the second IP address, where the second substream is a substream established by the user equipment with the communication peer by using the second IP address; and the user equipment is configured to remove the first substream after establishing the second substream.

With reference to the first aspect, in a first possible implementation, that the user equipment moves from the first base station to the second base station includes:

the user equipment in idle mode moves from the first base station to the second base station; or the user equipment in connected mode is handed over from the first base station to the second base station.

With reference to the first aspect or the first possible implementation of the first aspect, in a second possible implementation, the obtaining a second IP address when the second gateway and the first gateway are not the same gateway includes:

when the user equipment is connected to the first base station, the user equipment receives a first gateway identity sent by the first base station, where the first gateway identity is used to indicate the first gateway;

when the user equipment moves from the first base station to the second base station, the user equipment receives a second gateway identity sent by the second base station, where the second gateway identity is used to indicate the second gateway; and if the second gateway identity is different from the first gateway identity, the user equipment sends an IP address obtaining request message to the second gateway, and receives the second IP address sent by the second gateway.

With reference to the first aspect or the first possible implementation of the first aspect, in a third possible implementation, the obtaining a second IP address when the second gateway and the first gateway are not the same gateway includes:

the mobility management system further includes a second mobility management entity, where the second mobility management entity is configured to manage the second base station and the second gateway; and when the second mobility management entity determines, according to a context of the user equipment, that the second gateway and the first gateway are not the same gateway, the second mobility management entity requests the second gateway to allocate the IP address to the user equipment, and sends the second IP address received from the second gateway to the user equipment.

With reference to the first aspect or the first possible implementation of the first aspect, in a fourth possible implementation, the obtaining a second IP address when the second gateway and the first gateway are not the same gateway includes:

the mobility management system further includes a second mobility management entity, where the second mobility management entity is configured to manage the second base station and the second gateway;

when the user equipment moves from the first base station to the second base station, the user equipment sends the first IP address or a first gateway identity to the second mobility management entity, where the first gateway identity is used to indicate the first gateway;

the second mobility management entity determines whether the first IP address is the IP address allocated by the second gateway to the user equipment, or whether the first gateway identity is the same as a second gateway identity, where the second gateway identity is used to indicate the second gateway; and when the first IP address is not the IP address allocated by the second gateway to the user equipment or the first gateway identity is different from the second gateway identity, the second mobility management entity requests the second gateway to allocate the IP address to the user equipment, and sends the second IP address received from the second gateway to the user equipment.

With reference to the first aspect or the first possible implementation of the first aspect, in a fifth possible implementation, the obtaining a second IP address when the second gateway and the first gateway are not the same gateway includes:

the mobility management system further includes a second mobility management entity, where the second mobility management entity is configured to manage the second base station and the second gateway;

when the user equipment moves from the first base station to the second base station, the first base station is further configured to obtain an identity of the second base station;

when determining that the identity of the second base station does not belong to a base station identity list stored in the first base station, the first base station sends a determining indication message to the second mobility management entity, where the base station identity list includes identities of base stations connected to the first gateway, and the determining indication message is used to indicate that the second gateway and the first gateway are not the same gateway; and after receiving the determining indication message, the second mobility management entity requests the second gateway to allocate the IP address to the user equipment, and sends the second IP address received from the second gateway to the user equipment.

With reference to the first aspect or the first possible implementation of the first aspect, in a sixth possible implementation, the obtaining a second IP address when the second gateway and the first gateway are not the same gateway includes:

when the first base station determines that the user equipment moves from the first base station to the second base station, the first base station is further configured to obtain an identity of the second base station;

when the identity of the second base station does not belong to a base station identity list stored in the first base station, the first base station sends a determining indication message to the user equipment, where the base station identity list includes identities of base stations connected to the first gateway, and the determining indication message is used to indicate that the second gateway and the first gateway are not the same gateway; and after receiving the determining indication message, the user equipment sends an IP address obtaining request message to the second gateway, and receives the second IP address sent by the second gateway.

With reference to the first aspect, in a seventh possible implementation, the first base station or the second base station is configured to establish a data forwarding tunnel between the first base station and the second base station; and the user equipment and the communication peer are further configured to transmit data of the first substream through the data forwarding tunnel.

With reference to the seventh possible implementation of the first aspect, in an eighth possible implementation, the data forwarding tunnel includes one or more of the following:

a downlink data forwarding tunnel or an uplink data forwarding tunnel; and the second base station is further configured to forward data of the first substream based on a source address of uplink data of the user equipment or a bearer corresponding to the first substream.

With reference to the third possible implementation to the fifth possible implementation of the first aspect, in a ninth possible implementation, the user equipment in idle mode moves from the first base station to the second base station, and after being connected to the second base station and completing a location update, enters the idle mode;

the mobility management system further includes the second mobility management entity, where the second mobility management entity is configured to manage the first base station, the first gateway, the second base station, and the second gateway;

the first gateway is further configured to send a downlink data notification of the user equipment to the second mobility management entity after the user equipment enters the idle mode;

the second mobility management entity is further configured to receive the downlink data notification of the user equipment from the first gateway, and after receiving the downlink data notification of the user equipment, page the user equipment; and the user equipment is further configured to respond to the paging of the second mobility management entity.

With reference to the ninth possible implementation of the first aspect, in a tenth possible implementation, the first gateway is further configured to cache downlink data;

after the user equipment responds to the paging, the second mobility management entity is further configured to establish a data forwarding tunnel between the first gateway and the second gateway, or establish a data forwarding tunnel between the first gateway and the second base station; and the first gateway is further configured to send the downlink data to the user equipment through the data forwarding tunnel.

With reference to the third possible implementation to the fifth possible implementation of the first aspect, in an eleventh possible implementation, the user equipment in idle mode moves from the first base station to the second base station, and after being connected to the second base station and completing a location update, enters the idle mode;

the mobility management system further includes a first mobility management entity and the second mobility management entity, where the first mobility management entity is configured to manage the first base station and the first gateway, and the second mobility management entity is configured to manage the second base station and the second gateway;

the second mobility management entity is further configured to register a downlink data notification of the user equipment with the first mobility management entity;

the first gateway is further configured to send the downlink data notification of the user equipment to the first mobility management entity after the user equipment enters the idle mode;

the first mobility management entity is further configured to send the downlink data notification of the user equipment to the second mobility management entity after acknowledging registration of the second mobility management entity;

the second mobility management entity is further configured to page the user equipment after receiving the downlink data notification of the user equipment; and the user equipment is further configured to respond to the paging of the second mobility management entity.

With reference to the eleventh possible implementation of the first aspect, in a twelfth possible implementation, the first gateway is further configured to cache downlink data;

after the user equipment responds to the paging, the second mobility management entity is further configured to establish, through the first mobility management entity, a data forwarding tunnel between the first gateway and the second gateway, or a data forwarding tunnel between the first gateway and the second base station; and the first gateway is further configured to send the downlink data to the user equipment through the data forwarding tunnel.

With reference to the ninth possible implementation or the eleventh possible implementation of the first aspect, in a thirteenth possible implementation, that the second mobility management entity requests the second gateway to allocate the IP address to the user equipment includes:

after the user equipment responds to the paging, the second mobility management entity requests the second gateway to allocate the IP address to the user equipment.

With reference to any one of the first aspect to the thirteenth possible implementation of the first aspect, in a fourteenth possible implementation, after removing the first substream, the user equipment is further configured to instruct the second base station or the second mobility management entity to send a network resource release indication message to the first gateway, where the first mobility management entity is configured to manage the first base station and the first gateway; and after receiving the network resource release indication message triggered by the instruction of the user equipment, the first gateway is configured to release a network resource occupied for transmitting the first substream.

With reference to the fourteenth possible implementation of the first aspect, in a fifteenth possible implementation, when the data forwarding tunnel is established between the first base station and the second base station, the second base station is further configured to remove the data forwarding tunnel after the first substream is removed; or when the data forwarding tunnel is established between the first gateway and the second gateway, or the data forwarding tunnel is established between the first gateway and the second base station, the first gateway is further configured to remove the data forwarding tunnel after the first substream is removed.

With reference to the first aspect, in a sixteenth possible implementation, the mobility management system further includes a first mobility management entity, an online charging system OCS, and a policy and charging rules function PCRF, where the first mobility management entity is configured to obtain an available quota of the user equipment from the online charging system, and send the available quota of the user equipment to the first gateway;

the first mobility management entity is further configured to obtain a charging rule of the user equipment from the policy and charging rules function, and send the charging rule of the user equipment to the first gateway; and when the user equipment communicates with the communication peer by using the first substream, the first gateway is further configured to reduce the available quota of the user equipment according to the charging rule of the user equipment, and send a balance of the available quota of the user equipment to the online charging system.

With reference to the first aspect, in a seventeenth possible implementation, the mobility management system further includes a first mobility management entity and an offline charging system OFCS, where the first gateway is further configured to send a call detail record of the user equipment on the first gateway to the first mobility management entity; and the first mobility management entity is configured to send the call detail record of the user equipment on the first gateway to the offline charging system.

According to a second aspect, user equipment includes a processor, a memory, and a bus, where the processor and the memory are interconnected by the bus, where when the user equipment is connected to a first base station, the processor is configured to establish a first substream with a communication peer, where the first substream is a substream established by the user equipment with the communication peer by using a first Internet Protocol IP address, the first IP address is an IP address allocated by a first gateway to the user equipment, and the first gateway is connected to the first base station;

when the user equipment moves from the first base station to a second base station, the processor is further configured to obtain a second IP address when a second gateway and the first gateway are not the same gateway, where the second base station is connected to the second gateway, and the second IP address is an IP address allocated by the second gateway to the user equipment;

the processor is further configured to establish a second substream with the communication peer, where the second substream is a substream established by the user equipment with the communication peer by using the second IP address; and the processor is further configured to remove the first substream after establishing the second substream.

With reference to the second aspect, in a first possible implementation, the user equipment further includes a transmitter and a receiver, where when the user equipment is connected to the first base station, the receiver is configured to receive a first gateway identity sent by the first base station, where the first gateway identity is used to indicate the first gateway;

when the user equipment moves from the first base station to the second base station, the receiver is further configured to receive a second gateway identity sent by the second base station, where the second gateway identity is used to indicate the second gateway;

the processor is further configured to determine whether the second gateway identity is the same as the first gateway identity, and if the second gateway identity is different from the first gateway identity, generate an IP address obtaining request message;

the transmitter is configured to send the IP address obtaining request message to the second gateway; and the receiver is further configured to receive the second IP address sent by the second gateway.

With reference to the second aspect, in a second possible implementation, the user equipment further includes a transmitter and a receiver, where when the user equipment moves from the first base station to the second base station, the transmitter is configured to send the first IP address or a first gateway identity to a second mobility management entity, so that the second mobility management entity determines, according to the first IP address or the first gateway identity, whether the second gateway and the first gateway are the same gateway and when the second gateway and the first gateway are not the same gateway, requests the second gateway to allocate the IP address to the user equipment and sends the second IP address received from the second gateway to the user equipment, where the first gateway identity is used to indicate the first gateway, and the second mobility management entity is configured to manage the second base station and the second gateway; and the receiver is configured to receive the second IP address sent by the second mobility management entity.

With reference to the second aspect, in a third possible implementation, the user equipment further includes a transmitter and a receiver, where when the user equipment moves from the first base station to the second base station, the transmitter is configured to send an identity of the second base station to the first base station, so that the first base station determines whether the second gateway and the first gateway are the same gateway, where the second gateway identity is used to indicate the second gateway;

the receiver is configured to receive a determining indication message sent by the first base station, where the determining indication message is used to indicate that the second gateway and the first gateway are not the same gateway;

the processor is further configured to generate an IP address obtaining request message;

the transmitter is further configured to send the IP address obtaining request message to the second gateway; and the receiver is further configured to receive the second IP address sent by the second gateway.

With reference to the second aspect, in a fourth possible implementation, the user equipment further includes a transmitter and a receiver, where the processor is further configured to control the user equipment to enter idle mode after the user equipment is connected to the second base station and completes a location update;

the receiver is further configured to receive paging of a first mobility management entity or a second mobility management entity when the user equipment is in idle mode, where the first mobility management entity is configured to manage the first base station and the first gateway, and the second mobility management entity is configured to manage the second base station and the second gateway;

the processor is further configured to generate a paging response message;

the transmitter is configured to send the paging response message to the first mobility management entity or the second mobility management entity; and the receiver is further configured to receive downlink data forwarded by the first gateway.

With reference to the second aspect, in a fifth possible implementation, the processor is further configured to generate a network resource release indication message after removing the first substream; and the user equipment further includes a transmitter, configured to send the network resource release indication message to the first gateway through the second base station or a second mobility management entity, so that the first gateway releases a network resource occupied for transmitting the first substream, where the first mobility management entity is configured to manage the first base station and the first gateway.

With reference to the second aspect, in a sixth possible implementation, after removing the first substream, the processor is further configured to release a network resource occupied for transmitting the first substream, and generate an indication message indicating that the first substream is already removed; and the transceiver unit is further configured to send, to the second base station, the indication message indicating that the first substream is already removed, so that the second base station releases a network resource occupied for transmitting the first substream.

According to a third aspect, a first base station includes a processor, a memory, a transmitter, a receiver, and a bus, where the processor, the memory, the transmitter, and the receiver are interconnected by the bus, where when the user equipment moves from the first base station to a second base station, and before a second substream is established, the processor is configured to generate a request message for establishing a data forwarding tunnel between the first base station and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address, the first IP address is an IP address allocated by a first gateway to the user equipment, and the first gateway is connected to the first base station;

the transmitter is configured to send, to the second base station, the request message for establishing the data forwarding tunnel between the first base station and the second base station;

the receiver is configured to receive a message sent by the second base station for acknowledging establishment of the data forwarding tunnel;

the receiver is further configured to receive a request message sent by the second base station for removing the data forwarding tunnel;

the transmitter is further configured to send a message for acknowledging removal of the data forwarding tunnel to the second base station; and the processor is further configured to remove the data forwarding tunnel.

With reference to the third aspect, in a first possible implementation, the data forwarding tunnel between the first base station and the second base station includes one or more of the following:

a downlink data forwarding tunnel or an uplink data forwarding tunnel.

With reference to the third aspect, in a second possible implementation, the receiver is further configured to receive a network resource release indication message sent by the user equipment; and the transmitter is further configured to forward the indication message to the first gateway, so that the first gateway releases a network resource occupied for transmitting the first substream.

With reference to the third aspect, in a third possible implementation, the receiver is further configured to obtain an identity of the second base station;

the processor is further configured to determine whether the identity of the second base station belongs to a base station identity list stored in the first base station, and when the identity of the second base station does not belong to the base station identity list stored in the first base station, generate a determining indication message, where the determining indication message is used to indicate that the second gateway and the first gateway are not the same gateway; and the transmitter is further configured to send the determining indication message to the user equipment, so that the user equipment requests to obtain the second IP address from the second gateway.

According to a fourth aspect, a second base station includes a processor, a memory, a transmitter, a receiver, and a bus, where the processor, the memory, the transmitter, and the receiver are interconnected by the bus, where when the user equipment moves from a first base station to the second base station, and before a second substream is established, the receiver is configured to receive a request message sent by the first base station for establishing a data forwarding tunnel between the first base station and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address before the user equipment is handed over from the first base station to the second base station, the first IP address is an IP address allocated by a first gateway to the user equipment, and the first gateway is connected to the first base station;

the processor is configured to generate a message for acknowledging establishment of the data forwarding tunnel;

the transmitter is configured to send, to the first base station, the message for acknowledging establishment of the data forwarding tunnel;

the processor is further configured to generate a request message for removing the data forwarding tunnel after the first substream is removed;

the transmitter is further configured to send, to the first base station, the request message for removing the data forwarding tunnel;

the receiver is further configured to receive a message sent by the first base station for acknowledging removal of the data forwarding tunnel; and the processor is further configured to remove the data forwarding tunnel.

With reference to the fourth aspect, in a first possible implementation, the data forwarding tunnel between the first base station and the second base station includes one or more of the following:

a downlink data forwarding tunnel or an uplink data forwarding tunnel.

With reference to the fourth aspect, in a second possible implementation, the receiver is further configured to receive uplink data sent by the user equipment;

the processor is further configured to identify data of the first substream based on a source address of the uplink data of the user equipment or a bearer corresponding to the first substream; and the transmitter is further configured to forward the data of the first substream to the first base station through the data forwarding tunnel.

With reference to the fourth aspect, in a third possible implementation, the receiver is further configured to: receive downlink data of the user equipment through a data forwarding tunnel between the first gateway and the second base station; or receive downlink data of the user equipment that is sent by the second gateway; or receive downlink data of the user equipment that is sent by a first mobility entity, where the first mobility management entity is configured to manage the first base station and the first gateway; or receive downlink data of the user equipment that is sent by a second mobility entity, where the second mobility management entity is configured to manage the second base station and the second gateway.

According to a fifth aspect, user equipment includes a multipath control unit and a transceiver unit, where when the user equipment is connected to a first base station, the multipath control unit is configured to establish a first substream with a communication peer, where the first substream is a substream established by the user equipment with the communication peer by using a first Internet Protocol IP address, the first IP address is an IP address allocated by a first gateway to the user equipment, and the first gateway is connected to the first base station;

when the user equipment moves from the first base station to a second base station, the multipath control unit is configured to obtain a second IP address when a second gateway and the first gateway are not the same gateway, where the second base station is connected to the second gateway, and the second IP address is an IP address allocated by the second gateway to the user equipment;

the multipath control unit is further configured to establish a second substream with the communication peer, where the second substream is a substream established by the user equipment with the communication peer by using the second IP address; and the multipath control unit is further configured to remove the first substream after establishing the second substream.

With reference to the fifth aspect, in a first possible implementation, the transceiver unit is further configured to: when the user equipment is connected to the first base station, receive a first gateway identity sent by the first base station, where the first gateway identity is used to indicate the first gateway; and when the user equipment moves from the first base station to the second base station, receive a second gateway identity sent by the second base station, where the second gateway identity is used to indicate the second gateway;

the multipath control unit is further configured to determine whether the second gateway identity is the same as the first gateway identity, and if the second gateway identity is different from the first gateway identity, generate an IP address obtaining request message; and the transceiver unit is further configured to send the IP address obtaining request message to the second gateway, and receive the second IP address sent by the second gateway.

With reference to the fifth aspect, in a second possible implementation, when the user equipment moves from the first base station to the second base station, the transceiver unit is further configured to send the first IP address or a first gateway identity to a second mobility management entity, so that the second mobility management entity determines, according to the first IP address or the first gateway identity, whether the second gateway and the first gateway are the same gateway and when the second gateway and the first gateway are not the same gateway, requests the second gateway to allocate the IP address to the user equipment and sends the second IP address received from the second gateway to the user equipment, where the first gateway identity is used to indicate the first gateway, and the second mobility management entity is configured to manage the second base station and the second gateway; and the transceiver unit is further configured to receive the second IP address sent by the second mobility management entity.

With reference to the fifth aspect, in a third possible implementation, when the user equipment moves from the first base station to the second base station, the transceiver unit is further configured to send an identity of the second base station to the first base station, so that the first base station determines whether the second gateway and the first gateway are the same gateway, where the second gateway identity is used to indicate the second gateway;

the transceiver unit is further configured to receive a determining indication message sent by the first base station, where the determining indication message is used to indicate that the second gateway and the first gateway are not the same gateway;

the multipath control unit is further configured to generate an IP address obtaining request message; and the transceiver unit is further configured to send the IP address obtaining request message to the second gateway, and receive the second IP address sent by the second gateway.

With reference to the fifth aspect, in a fourth possible implementation, the multipath control unit is further configured to control the user equipment to enter idle mode after the user equipment is connected to the second base station and completes a location update;

the transceiver unit is further configured to receive paging of a first mobility management entity or a second mobility management entity when the user equipment is in idle mode, where the first mobility management entity is configured to manage the first base station and the first gateway, and the second mobility management entity is configured to manage the second base station and the second gateway;

the multipath control unit is further configured to generate a paging response message;

the transceiver unit is configured to send the paging response message to the first mobility management entity or the second mobility management entity; and the transceiver unit is further configured to receive downlink data forwarded by the first gateway.

With reference to the fifth aspect, in a fifth possible implementation, the multipath control unit is further configured to generate a network resource release indication message after removing the first substream; and the transceiver unit is further configured to send the network resource release indication message to the first gateway through the second base station or a second mobility management entity, so that the first gateway releases a network resource occupied for transmitting the first substream, where the first mobility management entity is configured to manage the first base station and the first gateway.

With reference to the fifth aspect, in a sixth possible implementation,
after removing the first substream, the multipath control unit is further configured to release a network resource occupied for transmitting the first substream, and generate an indication message indicating that the first substream is already removed; and
the transceiver unit is further configured to send, to the second base station, the indication message indicating that the first substream is already removed, so that the second base station releases a network resource occupied for transmitting the first substream.

According to a sixth aspect, a first base station includes a control unit, a sending unit, and a receiving unit, where
when the user equipment moves from the first base station to the second base station, and before a second substream is established, the control unit is configured to generate a request message for establishing a data forwarding tunnel between the first base station and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address, the first IP address is an IP address allocated by a first gateway to the user equipment, and the first gateway is connected to the first base station;
the sending unit is configured to send, to the second base station, the request message for establishing the data forwarding tunnel between the first base station and the second base station;
the receiving unit is configured to receive a message sent by the second base station for acknowledging establishment of the data forwarding tunnel;
the receiving unit is further configured to receive a request message sent by the second base station for removing the data forwarding tunnel;
the sending unit is further configured to send a message for acknowledging removal of the data forwarding tunnel to the second base station; and
the control unit is further configured to remove the data forwarding tunnel.

With reference to the sixth aspect, in a first possible implementation,
the data forwarding tunnel between the first base station and the second base station includes one or more of the following:
a downlink data forwarding tunnel or an uplink data forwarding tunnel.

With reference to the sixth aspect, in a second possible implementation,
the receiving unit is further configured to receive a network resource release indication message sent by the user equipment; and
the sending unit is further configured to forward the indication message to the first gateway, so that the first gateway releases a network resource occupied for transmitting the first substream.

With reference to the sixth aspect, in a third possible implementation,
the receiving unit is further configured to obtain an identity of the second base station;
the processing unit is further configured to determine whether the identity of the second base station belongs to a base station identity list stored in the first base station, and when the identity of the second base station does not belong to the base station identity list stored in the first base station, generate a determining indication message, where the determining indication message is used to indicate that the second gateway and the first gateway are not the same gateway; and
the sending unit is further configured to send the determining indication message to the user equipment, so that the user equipment requests to obtain the second IP address from the second gateway.

According to a seventh aspect, a second base station includes a control unit, a sending unit, and a receiving unit, where
when the user equipment moves from a first base station to the second base station, and before a second substream is established, the receiving unit is configured to receive a request message sent by the first base station for establishing a data forwarding tunnel between the first base station and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address before the user equipment is handed over from the first base station to the second base station, the first IP address is an IP address allocated by a first gateway to the user equipment, and the first gateway is connected to the first base station;
the control unit is configured to generate a message for acknowledging establishment of the data forwarding tunnel;
the sending unit is configured to send, to the first base station, the message for acknowledging establishment of the data forwarding tunnel;
the control unit is further configured to generate a request message for removing the data forwarding tunnel after the first substream is removed;
the sending unit is further configured to send, to the first base station, the request message for removing the data forwarding tunnel;
the receiving unit is further configured to receive a message sent by the first base station for acknowledging removal of the data forwarding tunnel; and
the control unit is further configured to remove the data forwarding tunnel.

With reference to the seventh aspect, in a first possible implementation,
the data forwarding tunnel between the first base station and the second base station includes one or more of the following:
a downlink data forwarding tunnel or an uplink data forwarding tunnel.

With reference to the seventh aspect, in a second possible implementation, the receiving unit is further configured to receive uplink data sent by the user equipment;

the control unit is further configured to identify data of the first substream based on a source address of the uplink data of the user equipment or a bearer corresponding to the first substream; and the sending unit is further configured to forward the data of the first substream to the first base station through the data forwarding tunnel.

With reference to the seventh aspect, in a third possible implementation, the receiving unit is further configured to: receive downlink data of the user equipment through a data forwarding tunnel between the first gateway and the second base station; or receive downlink data of the user equipment that is sent by the second gateway; or receive downlink data of the user equipment that is sent by a first mobility entity, where the first mobility management entity is configured to manage the first base station and the first gateway; or receive downlink data of the user equipment that is sent by a second mobility entity, where the second mobility management entity is configured to manage the second base station and the second gateway.

According to an eighth aspect, a mobility management method includes:

establishing, by user equipment, a first substream with a communication peer, where the first substream is a substream established by the user equipment with the communication peer by using a first Internet Protocol IP address, the first IP address is an IP address allocated by a first gateway to the user equipment, and the first gateway is connected to a first base station;

when the user equipment moves from the first base station to a second base station, obtaining a second IP address when a second gateway and the first gateway are not the same gateway, where the second base station is connected to the second gateway, and the second IP address is an IP address allocated by the second gateway to the user equipment;

after obtaining the second IP address, establishing, by the user equipment, a second substream with the communication peer, where the second substream is a substream established by the user equipment with the communication peer by using the second IP address; and after establishing the second substream, removing, by the user equipment, the first substream.

With reference to the eighth aspect, in a first possible implementation, that the user equipment moves from the first base station to a second base station includes:

the user equipment in idle mode moves from the first base station to the second base station; or the user equipment in connected mode is handed over from the first base station to the second base station.

With reference to the eighth aspect or the first possible implementation of the eighth aspect, in a second possible implementation, the obtaining a second IP address when a second gateway and the first gateway are not the same gateway includes:

when the user equipment is connected to the first base station, the user equipment receives a first gateway identity sent by the first base station, where the first gateway identity is used to indicate the first gateway;

when the user equipment moves from the first base station to the second base station, the user equipment receives a second gateway identity sent by the second base station, where the second gateway identity is used to indicate the second gateway; and if the second gateway identity is different from the first gateway identity, the user equipment sends an IP address obtaining request message to the second gateway, and receives the second IP address sent by the second gateway.

With reference to the eighth aspect or the first possible implementation of the eighth aspect, in a third possible implementation, the obtaining a second IP address when a second gateway and the first gateway are not the same gateway includes:

when a second mobility management entity determines, according to a context of the user equipment, that the second gateway and the first gateway are not the same gateway, the second mobility management entity requests the second gateway to allocate the IP address to the user equipment, and sends the second IP address received from the second gateway to the user equipment, where the second mobility management entity is configured to manage the second base station and the second gateway.

With reference to the eighth aspect or the first possible implementation of the eighth aspect, in a fourth possible implementation, the obtaining a second IP address when a second gateway and the first gateway are not the same gateway includes:

when the user equipment moves from the first base station to the second base station, the user equipment sends the first IP address or a first gateway identity to a second mobility management entity, where the first gateway identity is used to indicate the first gateway, and the second mobility management entity is configured to manage the second base station and the second gateway;

the second mobility management entity determines whether the first IP address is the IP address allocated by the second gateway to the user equipment, or whether the first gateway identity is the same as a second gateway identity, where the second gateway identity is used to indicate the second gateway; and when the first IP address is not the IP address allocated by the second gateway to the user equipment or the first gateway identity is different from the second gateway identity, the second mobility management entity requests the second gateway to allocate the IP address to the user equipment, and sends the second IP address received from the second gateway to the user equipment.

With reference to the eighth aspect or the first possible implementation of the eighth aspect, in a fifth possible implementation, the obtaining a second IP address when a second gateway and the first gateway are not the same gateway includes:

when the user equipment moves from the first base station to the second base station, the first base station is further configured to obtain an identity of the second base station;

when determining that the identity of the second base station does not belong to a base station identity list stored in the first base station, the first base station sends a determining indication message to a second mobility management entity, where the base station identity list includes identities of base stations connected to the first gateway, the determining indication message is used to indicate that the second gateway and the first gateway are not the same gateway, and the second mobility management entity is configured to manage the second base station and the second gateway; and after receiving the determining indication message, the second mobility management entity requests the second gateway to allocate the IP address to the user equipment, and sends the second IP address received from the second gateway to the user equipment.

With reference to the eighth aspect or the first possible implementation of the eighth aspect, in a sixth possible implementation, the obtaining a second IP address when a second gateway and the first gateway are not the same gateway includes:

when the user equipment moves from the first base station to the second base station, the first base station is further configured to obtain an identity of the second base station;

when determining that the identity of the second base station does not belong to a base station identity list stored in the first base station, the first base station sends a determining indication message to the user equipment, where the base station identity list includes identities of base stations connected to the first gateway, and the determining indication message is used to indicate that the second gateway and the first gateway are not the same gateway; and after receiving the determining indication message, the user equipment sends an IP address obtaining request message to the second gateway, and receives the second IP address sent by the second gateway.

With reference to the eighth aspect, in a seventh possible implementation, the method further includes:

establishing a data forwarding tunnel between the first base station and the second base station; and transmitting, by the user equipment and the communication peer, data of the first substream through the data forwarding tunnel.

With reference to the seventh possible implementation of the eighth aspect, in an eighth possible implementation, the data forwarding tunnel includes one or more of the following:

a downlink data forwarding tunnel or an uplink data forwarding tunnel; and the second base station is further configured to forward data of the first substream based on a source address of uplink data of the user equipment or a bearer corresponding to the first substream.

With reference to the third possible implementation to the fifth possible implementation of the eighth aspect, in a ninth possible implementation, the method further includes:

moving, by the user equipment in idle mode, from the first base station to the second base station, and after being connected to the second base station and completing a location update, entering the idle mode;

after the user equipment enters the idle mode, sending, by the first gateway, a downlink data notification of the user equipment to the second mobility management entity, where the second mobility management entity is configured to manage the first base station, the first gateway, the second base station, and the second gateway;

receiving, by the second mobility management entity, the downlink data notification of the user equipment from the first gateway, and after receiving the downlink data notification of the user equipment, paging the user equipment; and responding, by the user equipment, to the paging of the second mobility management entity.

With reference to the ninth possible implementation of the eighth aspect, in a tenth possible implementation, caching, by the first gateway, downlink data;

after the user equipment responds to the paging, establishing, by the second mobility management entity, a data forwarding tunnel between the first gateway and the second gateway, or establishing a data forwarding tunnel between the first gateway and the second base station; and sending, by the first gateway, the downlink data to the user equipment through the data forwarding tunnel.

With reference to the third possible implementation to the fifth possible implementation of the eighth aspect, in an eleventh possible implementation, the method further includes:

moving, by the user equipment in idle mode, from the first base station to the second base station, and after being connected to the second base station and completing a location update, entering the idle mode;

registering, by the second mobility management entity, a downlink data notification of the user equipment with a first mobility management entity, where the second mobility management entity is configured to manage the second base station and the second gateway, and the first mobility management entity is configured to manage the first base station and the first gateway;

after the user equipment enters the idle mode, sending, by the first gateway, the downlink data notification of the user equipment to the first mobility management entity;

after acknowledging registration of the second mobility management entity, sending, by the first mobility management entity, the downlink data notification of the user equipment to the second mobility management entity;

after receiving the downlink data notification of the user equipment, paging, by the second mobility management entity, the user equipment; and responding, by the user equipment, to the paging of the second mobility management entity.

With reference to the eleventh possible implementation of the eighth aspect, in a twelfth possible implementation, the method further includes:

caching, by the first gateway, downlink data;

after the user equipment responds to the paging, establishing, by the second mobility management entity through the first mobility management entity, a data forwarding tunnel between the first gateway and the second gateway, or a data forwarding tunnel between the first gateway and the second base station; and sending, by the first gateway, the downlink data to the user equipment through the data forwarding tunnel.

With reference to the ninth possible implementation or the eleventh possible implementation of the eighth aspect, in a thirteenth possible implementation, that the second mobility management entity requests the second gateway to allocate the IP address to the user equipment includes:

after the user equipment responds to the paging, the second mobility management entity requests the second gateway to allocate the IP address to the user equipment.

With reference to any one of the eighth aspect to the thirteenth possible implementation of the eighth aspect, in a fourteenth possible implementation, the method further includes:

after removing the first substream, instructing, by the user equipment, the second base station or the second mobility management entity to send a network resource release indication message to the first gateway, where the first mobility management entity is configured to manage the first base station and the first gateway; and after receiving the network resource release indication message triggered by the instruction of the user equipment, releasing, by the first gateway, a network resource occupied for transmitting the first substream.

With reference to the fourteenth possible implementation of the eighth aspect, in a fifteenth possible implementation, when the data forwarding tunnel is established between the first base station and the second base station, removing, by the second base station, the data forwarding tunnel after the first substream is removed; or when the data forwarding tunnel is established between the first gateway and the second gateway, or the data forwarding tunnel is established between the first gateway and the second base station, removing, by the first gateway, the data forwarding tunnel after the first substream is removed.

With reference to the eighth aspect, in a sixteenth possible implementation, the method further includes:

obtaining, by a first mobility management entity, an available quota of the user equipment from an online charging system, and sending the available quota of the user equipment to the first gateway;

obtaining, by the first mobility management entity, a charging rule of the user equipment from a policy and charging rules function, and sending the charging rule of the user equipment to the first gateway; and when the user equipment communicates with the communication peer by using the first substream, reducing, by the first gateway, the available quota of the user equipment according to the charging rule of the user equipment, and sending a balance of the available quota of the user equipment to the online charging system.

With reference to the eighth aspect, in a sixteenth possible implementation, the method further includes:

sending, by the first gateway, a call detail record of the user equipment on the first gateway to a first mobility management entity; and sending, by the first mobility management entity, the call detail record of the user equipment on the first gateway to an offline charging system.

According to a ninth aspect, a mobility management method is applied to user equipment, where the method includes:

when the user equipment is connected to a first base station, establishing, by the user equipment, a first substream with a communication peer, where the first substream is a substream established by the user equipment with the communication peer by using a first Internet Protocol IP address, the first IP address is an IP address allocated by a first gateway to the user equipment, and the first gateway is connected to the first base station;

when the user equipment moves from the first base station to a second base station, obtaining, by the user equipment, a second IP address when a second gateway and the first gateway are not the same gateway, where the second base station is connected to the second gateway, and the second IP address is an IP address allocated by the second gateway to the user equipment;

establishing, by the user equipment, a second substream with the communication peer, where the second substream is a substream established by the user equipment with the communication peer by using the second IP address; and after establishing the second substream, removing, by the user equipment, the first substream.

With reference to the ninth aspect, in a first possible implementation, the obtaining, by the user equipment, a second IP address when a second gateway and the first gateway are not the same gateway includes:

when the user equipment is connected to the first base station, receiving a first gateway identity sent by the first base station, where the first gateway identity is used to indicate the first gateway;

when the user equipment moves from the first base station to the second base station, receiving a second gateway identity sent by the second base station, where the second gateway identity is used to indicate the second gateway; and determining, by the user equipment, whether the second gateway identity is the same as the first gateway identity, and if the second gateway identity is different from the first gateway identity, sending, by the user equipment, an IP address obtaining request message to the second gateway, and receiving the second IP address sent by the second gateway.

With reference to the ninth aspect, in a second possible implementation, the obtaining, by the user equipment, a second IP address when a second gateway and the first gateway are not the same gateway includes:

when the user equipment moves from the first base station to the second base station, sending the first IP address or a first gateway identity to a second mobility management entity, so that the second mobility management entity determines, according to the first IP address or the first gateway identity, whether the second gateway and the first gateway are the same gateway and when the second gateway and the first gateway are not the same gateway, requests the second gateway to allocate the IP address to the user equipment and sends the second IP address received from the second gateway to the user equipment, where the first gateway identity is used to indicate the first gateway, and the second mobility management entity is configured to manage the second base station and the second gateway; and receiving the second IP address sent by the second mobility management entity.

With reference to the ninth aspect, in a third possible implementation, the obtaining, by the user equipment, a second IP address when a second gateway and the first gateway are not the same gateway includes:

when the user equipment moves from the first base station to the second base station, sending an identity of the second base station to the first base station, so that the first base station determines whether the second gateway and the first gateway are the same gateway, where the second gateway identity is used to indicate the second gateway; and receiving, by the user equipment, a determining indication message sent by the first base station, sending an IP address obtaining request message to the second gateway, and receiving the second IP address sent by the second gateway, where the determining indication message is used to indicate that the second gateway and the first gateway are not the same gateway.

With reference to the ninth aspect, in a fourth possible implementation, the method further includes:
after the user equipment is connected to the second base station and completes a location update, entering idle mode;
when the user equipment is in idle mode, receiving paging of a first mobility management entity or a second mobility management entity, where the first mobility management entity is configured to manage the first base station and the first gateway, and the second mobility management entity is configured to manage the second base station and the second gateway;
responding, by the user equipment, to the paging of the first mobility management entity or the second mobility management entity; and
after the user equipment responds to the paging, receiving downlink data forwarded by the first gateway.

With reference to the ninth aspect, in a fifth possible implementation, after the removing the first substream, the method further includes:
instructing, by the user equipment by using the first base station or a first mobility management entity, the first gateway to release a network resource occupied for transmitting the first substream, where the first mobility management entity is configured to manage the first base station and the first gateway.

With reference to the ninth aspect, in a sixth possible implementation, after the removing the first substream, the method further includes:
releasing, by the user equipment, a network resource occupied for transmitting the first substream, and instructing the second base station to release a network resource occupied for transmitting the first substream.

According to a tenth aspect, a mobility management method is applied to a first base station, where the method includes:
when the user equipment moves from the first base station to a second base station, and before a second substream is established, sending, by the first base station to the second base station, a request message for establishing a data forwarding tunnel between the first base station and the second base station, and receiving a message sent by the second base station for acknowledging establishment of the data forwarding tunnel, where
the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address before the user equipment is handed over from the first base station to the second base station, the first IP address is an IP address allocated by a first gateway to the user equipment, and the first gateway is connected to the first base station; and
after receiving a request message sent by the second base station for removing the data forwarding tunnel, sending a message for acknowledging removal of the data forwarding tunnel to the second base station, and removing the data forwarding tunnel.

With reference to the tenth aspect, in a first possible implementation, the data forwarding tunnel between the first base station and the second base station includes one or more of the following:
a downlink data forwarding tunnel or an uplink data forwarding tunnel.

With reference to the tenth aspect, in a second possible implementation, the method further includes:
receiving a network resource release indication message sent by the user equipment; and
forwarding the indication message to the first gateway, so that the first gateway releases a network resource occupied for transmitting the first substream.

With reference to the tenth aspect, in a third possible implementation, the method further includes:
obtaining an identity of the second base station;
determining whether the identity of the second base station belongs to a base station identity list stored in the first base station, and when the identity of the second base station does not belong to the base station identity list stored in the first base station, generating a determining indication message, where the determining indication message is used to indicate that the second gateway and the first gateway are not the same gateway; and
sending the determining indication message to the user equipment, so that the user equipment requests to obtain the second IP address from the second gateway.

According to an eleventh aspect, a mobility management method is applied to a second base station, where the method includes: when the user equipment moves from the first base station to the second base station, and before a second substream is established, receiving a request message sent by the first base station for establishing a data forwarding tunnel between the first base station and the second base station, and sending, to the first base station, a message for acknowledging establishment of the data forwarding tunnel, where
the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address before the user equipment is handed over from the first base station to the second base station, the first IP address is an IP address allocated by a first gateway to the user equipment, and the first gateway is connected to the first base station;
after the first substream is removed, sending, to the first base station, a request message for removing the data forwarding tunnel, and receiving a message sent by the first base station for acknowledging removal of the data forwarding tunnel; and
after receiving the message sent by the first base station for acknowledging removal of the data forwarding tunnel, removing the data forwarding tunnel.

With reference to the eleventh aspect, in a first possible implementation, the data forwarding tunnel between the first base station and the second base station includes one or more of the following:
a downlink data forwarding tunnel or an uplink data forwarding tunnel.

With reference to the eleventh aspect, in a second possible implementation, the method further includes:
receiving uplink data sent by the user equipment;
identifying data of the first substream based on a source address of the uplink data of the user equipment or a bearer corresponding to the first substream; and
forwarding the data of the first substream to the first base station through the data forwarding tunnel.

With reference to the eleventh aspect, in a third possible implementation, the method further includes:
receiving downlink data of the user equipment through a data forwarding tunnel between the first gateway and the second base station; or
receiving downlink data of the user equipment that is sent by the second gateway; or
receiving downlink data of the user equipment that is sent by a first mobility entity, where the first mobility management entity is configured to manage the first base station and the first gateway; or
receiving downlink data of the user equipment that is sent by a second mobility entity, where the second mobility management entity is configured to manage the second base station and the second gateway.

According to the mobility management method, apparatus, and system provided by the embodiments of the present invention, an IP address is dynamically allocated to the user equipment by the first gateway and the second gateway. In the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. According to the mobility management method, apparatus, and system provided by the embodiments of the present invention, when the user equipment moves from the first gateway to the second gateway, the user equipment establishes the second substream with the communication peer by using the second IP address. Before the second substream is established, the user equipment communicates with the communication peer by using the first substream. After the second substream is established, the first substream is removed. Therefore, normal communication between the user equipment and the base station is effectively ensured without using an anchor device, and service continuity between the user equipment and the communication peer is ensured.

BRIEF DESCRIPTION OF DRAWINGS

To describe the technical solutions in the embodiments of the present invention more clearly, the following briefly describes the accompanying drawings required for describing the embodiments.

Apparently, the accompanying drawings in the following description merely show some embodiments of the present invention, and a person of ordinary skill in the art can derive other drawings from these accompanying drawings without creative efforts.

DESCRIPTION OF EMBODIMENTS

Figure 1:
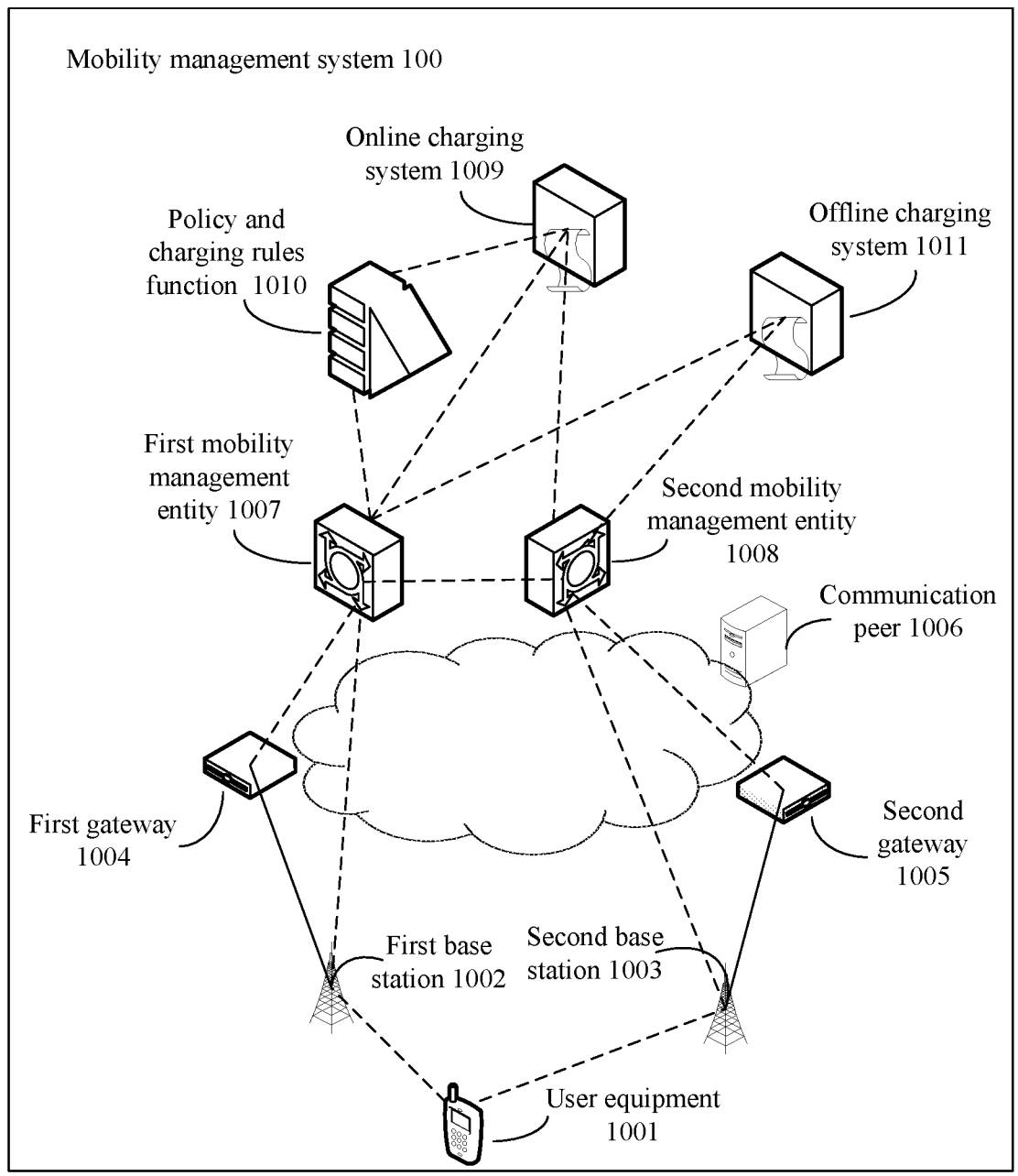
FIG. 1 is a schematic structural diagram of a mobility management system according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a mobility management method, an apparatus, and a system. A Long Term Evolution (LTE) cellular network is used as an example for description. The LTE cellular network includes a first base station, a second base station, a first gateway, a second gateway, a first mobility management entity (MME), a second mobility management entity, user equipment, and a communication peer. The first base station is connected to the first gateway. The second base station is connected to the second gateway. The first mobility management entity is configured to manage the first base station and the first gateway. The second mobility management entity is configured to manage the second base station and the second gateway. It should be noted that, in an actual application scenario, a plurality of base stations may be connected to a gateway. In an application scenario of the embodiments of the present invention, the first base station is a base station connected to the first gateway, the second base station is a base station connected to the second gateway, and the first gateway and the second gateway are not the same gateway. When the user equipment is connected to the first base station, the first gateway allocates a first IP address to the user equipment, and the user equipment establishes a TCP connection to the communication peer by using the first IP address. When the user equipment moves from the first base station to the second base station, because the second gateway and the first gateway are not the same gateway, and the first IP address does not belong to a management range of the second gateway, the second gateway needs to allocate a new IP address to the user equipment, and the user equipment establishes communication with the communication peer by using the new IP address. In the embodiments of the present invention, the IP address allocated by the second gateway to the user equipment is a second IP address. After obtaining the second IP address, the user equipment establishes a TCP connection to the communication peer by using the second IP address. The TCP connection established by the user equipment to the communication peer by using the first IP address is a first substream, and the TCP connection established by the user equipment to the communication peer by using the second IP address is a second substream. In the embodiments of the present invention, an application scenario in which an MPTCP substream is established by using an MPTCP technology is used as an example to describe the mobility management method, apparatus, and system.

Referring to FIG. 1, an embodiment of the present invention provides a mobility management system 100, including user equipment 1001, a first base station 1002, a second base station 1003, a first gateway 1004, a second gateway 1005, and a communication peer 1006. The first base station 1002 is connected to the first gateway 1004, and the second base station 1003 is connected to the second gateway 1005.

Optionally, the mobility management system 100 further includes a first mobility management entity 1007 and a second mobility management entity 1008. The first mobility management entity 1007 is configured to manage the first base station 1002 and the first gateway 1004. The second mobility management entity 1008 is configured to manage the second base station 1003 and the second gateway 1005.

The user equipment 1001 is configured to establish a first MPTCP substream with the communication peer 1006, where the first MPTCP substream is an MPTCP substream established by the user equipment 1001 with the communication peer 1006 by using a first Internet Protocol IP address, and the first IP address is an IP address allocated by the first gateway 1004 to the user equipment 1001.

Optionally, the communication peer 1006 may be a server or a user terminal supporting an MPTCP technology, or an MPTCP proxy or server, and the first gateway and the second gateway may be distributed local gateways (Local Gateway).

When the user equipment 1001 moves from the first base station 1002 to the second base station 1003, the user equipment 1001 is further configured to obtain a second IP address when the second gateway 1005 and the first gateway 1004 are not the same gateway, where the second IP address is an IP address allocated by the second gateway 1005 to the user equipment 1001.

The user equipment 1001 is further configured to establish a second MPTCP substream with the communication peer 1006 after obtaining the second IP address, where the second MPTCP substream is an MPTCP substream established by the user equipment 1001 with the communication peer 1006 by using the second IP address.

The communication peer 1006 is configured to remove the first MPTCP substream after establishing the second MPTCP substream.

In a mobility management system in the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. In the mobility management system provided by this embodiment of the present invention, an IP address is dynamically allocated to the user equipment by the first gateway and the second gateway. When the user equipment moves from the first gateway to the second gateway, the user equipment establishes the second MPTCP substream with the communication peer by using the MPTCP technology and using the second IP address. Before the second MPTCP substream is established, the user equipment communicates with the communication peer by using the first MPTCP substream. After the second MPTCP substream is established, the first MPTCP substream is removed. Therefore, normal communication between the user equipment and the base station is ensured, and service continuity between the user equipment and the communication peer is ensured.

Optionally, that the user equipment 1001 moves from the first base station 1002 to the second base station 1003 includes:
  the user equipment 1001 in idle mode moves from the first base station 1002 to the second base station 1003; or
  the user equipment 1001 in connected mode is handed over from the first base station 1002 to the second base station 1003.

Optionally, the obtaining a second IP address when the second gateway 1005 and the first gateway 1004 are not the same gateway includes:
  when the user equipment 1001 is connected to the first base station 1002, the user equipment receives an identity of the first gateway 1004 sent by the first base station 1002, where the identity of the first gateway 1004 is used to indicate the first gateway 1004;
  when the user equipment 1001 moves from the first base station 1002 to the second base station 1003, the user equipment receives an identity of the second gateway 1005 sent by the second base station 1003, where the identity of the second gateway 1005 is used to indicate the second gateway 1005; and
  if the identity of the second gateway 1005 is different from the identity of the first gateway 1004, the user equipment 1001 sends an IP address obtaining request message to the second gateway 1005, and receives the second IP address sent by the second gateway 1005.

Optionally, the obtaining a second IP address when the second gateway 1005 and the first gateway 1004 are not the same gateway includes:
  the mobility management system 100 further includes the second mobility management entity 1008, where the second mobility management entity 1008 is configured to manage the second base station 1003 and the second gateway 1005; and
  when the second mobility management entity 1008 determines, according to a context of the user equipment 1001, that the second gateway 1005 and the first gateway 1004 are not the same gateway, the second mobility management entity 1008 requests the second gateway 1005 to allocate the IP address to the user equipment 1001, and sends the second IP address received from the second gateway 1005 to the user equipment 1001.

Optionally, the obtaining a second IP address when the second gateway 1005 and the first gateway 1004 are not the same gateway includes:
  the mobility management system 100 further includes the second mobility management entity 1008, where the second mobility management entity 1008 is configured to manage the second base station 1003 and the second gateway 1005;
  when the user equipment 1001 moves from the first base station 1002 to the second base station 1003, the user equipment 1001 sends the first IP address or an identity of the first gateway 1004 to the second mobility management entity 1008, where the identity of the first gateway 1004 is used to indicate the first gateway 1004;
  the second mobility management entity 1008 determines whether the first IP address is the IP address allocated by the second gateway 1005 to the user equipment 1001, or whether the identity of the first gateway 1004 is the same as an identity of the second gateway 1005, where the identity of the second gateway 1005 is used to indicate the second gateway 1005; and
  when the first IP address is not the IP address allocated by the second gateway 1005 to the user equipment 1001 or the identity of the first gateway 1004 is different from the identity of the second gateway 1005, the second mobility management entity 1008 requests the second gateway 1005 to allocate the IP address to the user equipment 1001, and sends the second IP address received from the second gateway 1005 to the user equipment 1001.

Optionally, the obtaining a second IP address when the second gateway 1005 and the first gateway 1004 are not the same gateway includes:

the mobility management system 100 further includes the second mobility management entity 1008, where the second mobility management entity 1008 is configured to manage the second base station 1003 and the second gateway 1005;

when the user equipment 1001 moves from the first base station 1002 to the second base station 1003, the first base station 1002 is further configured to obtain an identity of the second base station 1003;

when the identity of the second base station 1003 does not belong to a base station identity list stored in the first base station 1002, the first base station sends a determining indication message to the second mobility management entity 1008, where the base station identity list includes identities of base stations connected to the first gateway 1004, and the determining indication message is used to indicate that the second gateway 1005 and the first gateway 1004 are not the same gateway; and after receiving the determining indication message, the second mobility management entity 1008 requests the second gateway 1005 to allocate the IP address to the user equipment 1001, and sends the second IP address received from the second gateway 1005 to the user equipment 1001.

Optionally, the obtaining a second IP address when the second gateway 1005 and the first gateway 1004 are not the same gateway includes:

when the user equipment 1001 moves from the first base station 1002 to the second base station 1003, the first base station 1002 is further configured to obtain an identity of the second base station 1003;

when the identity of the second base station 1003 does not belong to a base station identity list stored in the first base station 1002, the first base station sends a determining indication message to the user equipment 1001, where the base station identity list includes identities of base stations connected to the first gateway 1004, and the determining indication message is used to indicate that the second gateway 1005 and the first gateway 1004 are not the same gateway; and after receiving the determining indication message, the user equipment 1001 sends an IP address obtaining request message to the second gateway 1005, and receives the second IP address sent by the second gateway 1005.

Optionally, the first base station 1002 or the second base station 1003 is configured to establish a data forwarding tunnel between the first base station 1002 and the second base station 1003; and the user equipment 1001 and the communication peer 1006 are further configured to transmit data of the first substream through the data forwarding tunnel.

Optionally, the data forwarding tunnel includes:

a downlink data forwarding tunnel or an uplink data forwarding tunnel; or a downlink data forwarding tunnel and an uplink data forwarding tunnel.

That is, the data forwarding tunnel may include one or both of the downlink data forwarding tunnel and the uplink data forwarding tunnel.

The second base station 1003 is further configured to forward data of the first substream based on a source address of uplink data of the user equipment 1001 or a bearer corresponding to the first substream.

Optionally, the user equipment 1001 in idle mode moves from the first base station 1002 to the second base station 1003, and after being connected to the second base station 1003 and completing a location update, enters the idle mode;

the mobility management system 100 further includes the second mobility management entity 1008, where the second mobility management entity 1008 is configured to manage the first base station 1002, the first gateway 1004, the second base station 1003, and the second gateway 1005;

the first gateway 1004 is further configured to send a downlink data notification of the user equipment 1001 to the second mobility management entity 1008 after the user equipment 1001 enters the idle mode;

the second mobility management entity 1008 is further configured to receive the downlink data notification of the user equipment 1001 from the first gateway 1004, and after receiving the downlink data notification of the user equipment 1001, page the user equipment 1001; and the user equipment 1001 is further configured to respond to the paging of the second mobility management entity 1008.

Optionally, the first gateway 1004 is further configured to cache downlink data;

after the user equipment 1001 responds to the paging, the second mobility management entity 1008 is further configured to establish a data forwarding tunnel between the first gateway 1004 and the second gateway 1005, or establish a data forwarding tunnel between the first gateway 1004 and the second base station 1003; and the first gateway 1004 is further configured to send the downlink data to the user equipment 1001 through the data forwarding tunnel.

Optionally, the user equipment 1001 in idle mode moves from the first base station 1002 to the second base station 1003, and after being connected to the second base station 1003 and completing a location update, enters the idle mode;

the mobility management system 100 further includes the first mobility management entity 1007 and the second mobility management entity 1008, where the first mobility management entity 1007 is configured to manage the first base station 1002 and the first gateway 1004, and the second mobility management entity 1008 is configured to manage the second base station 1003 and the second gateway 1005;

the second mobility management entity 1008 is further configured to register a downlink data notification of the user equipment 1001 with the first mobility management entity 1007;

the first gateway 1004 is further configured to send the downlink data notification of the user equipment 1001 to the first mobility management entity 1007 after the user equipment 1001 enters the idle mode;

the first mobility management entity 1007 is further configured to send the downlink data notification of the user equipment 1001 to the second mobility management entity 1008 after acknowledging registration of the second mobility management entity 1008;

the second mobility management entity 1008 is further configured to page the user equipment 1001 after receiving the downlink data notification of the user equipment 1001; and the user equipment 1001 is further configured to respond to the paging of the second mobility management entity 1008.

Optionally, the first gateway 1004 is further configured to cache downlink data;

after the user equipment 1001 responds to the paging, the second mobility management entity 1008 is further configured to establish, through the first mobility management entity 1007, a data forwarding tunnel between the first gateway 1004 and the second gateway 1005, or a data forwarding tunnel between the first gateway 1004 and the second base station 1003; and the first gateway 1004 is further configured to send the downlink data to the user equipment 1001 through the data forwarding tunnel.

Optionally, that the second mobility management entity 1008 requests the second gateway 1005 to allocate the IP address to the user equipment 1001 includes:

after the user equipment 1001 responds to the paging, the second mobility management entity 1008 requests the second gateway 1005 to allocate the IP address to the user equipment 1001.

Optionally, after removing the first substream, the user equipment 1001 is further configured to instruct the second base station 1003 or the second mobility management entity 1008 to send a network resource release indication message to the first gateway 1004, where the first mobility management entity 1007 is configured to manage the first base station 1002 and the first gateway 1004; and after receiving the network resource release indication message triggered by the instruction of the user equipment 1001, the first gateway 1004 is configured to release a network resource occupied for transmitting the first substream.

Optionally, when the data forwarding tunnel is established between the first base station 1002 and the second base station 1003, the second base station 1003 is further configured to remove the data forwarding tunnel after the first substream is removed; or when the data forwarding tunnel is established between the first gateway 1004 and the second gateway 1005, or the data forwarding tunnel is established between the first gateway 1004 and the second base station 1003, the first gateway 1004 is further configured to remove the data forwarding tunnel after the first substream is removed.

Optionally, the mobility management system 100 further includes the first mobility management entity 1007, an online charging system (OCS), and a policy and charging rules function (PCRF), where the first mobility management entity 1007 is configured to obtain an available quota of the user equipment 1001 from the online charging system, and send the available quota of the user equipment 1001 to the first gateway 1004;

the first mobility management entity 1007 is further configured to obtain a charging rule of the user equipment 1001 from the policy and charging rules function, and send the charging rule of the user equipment 1001 to the first gateway 1004; and when the user equipment 1001 communicates with the communication peer 1006 by using the first substream, the first gateway 1004 is further configured to reduce the available quota of the user equipment 1001 according to the charging rule of the user equipment 1001, and send a balance of the available quota of the user equipment 1001 to the online charging system.

Optionally, the mobility management system 100 further includes the first mobility management entity 1007 and an offline charging system (OFCS), where the first gateway 1004 is further configured to send a call detail record of the user equipment 1001 on the first gateway 1004 to the first mobility management entity 1007; and the first mobility management entity 1007 is configured to send the call detail record of the user equipment 1001 on the first gateway 1004 to the offline charging system.

In the mobility management system provided by this embodiment of the present invention, an IP address is dynamically allocated to the user equipment by the first gateway and the second gateway. In the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. In the mobility management system provided by this embodiment of the present invention, when the user equipment moves from the first gateway to the second gateway, the user equipment establishes the second MPTCP substream with the communication peer by using the MPTCP technology and using the second IP address. Before the second MPTCP substream is established, the user equipment communicates with the communication peer by using the first MPTCP substream. After the second MPTCP substream is established, the first MPTCP substream is removed. Therefore, normal communication between the user equipment and the base station is ensured, and service continuity between the user equipment and the communication peer is ensured.

Figure 2:
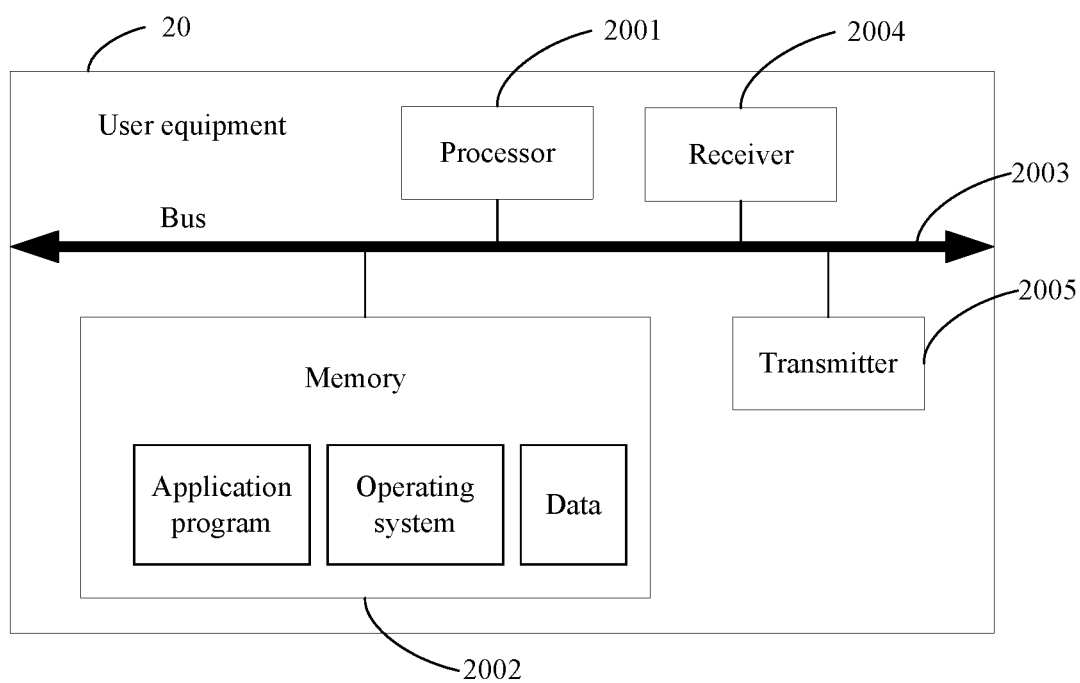
FIG. 2 is a schematic structural diagram of user equipment according to an embodiment of the present invention.

Referring to FIG. 2, an embodiment of the present invention provides user equipment 20, including a processor 2001, a memory 2002, and a bus 2003, where the processor 2001 and the memory 2002 are interconnected by the bus 2003. Optionally, the user equipment 20 further includes a receiver 2004 and a transmitter 2005, where the receiver 2004, the transmitter 2005, the processor 2001, and the memory 2002 are interconnected by the bus 2003.

The bus 2003 may be an industry standard architecture (ISA) bus, a peripheral component interconnect (PCI) bus, an extended industry standard architecture (EISA) bus, or the like. The bus 2003 may include an address bus, a data bus, a control bus, or the like. For ease of indicating, the bus in FIG. 2 is indicated by only a bold line. However, this does not mean that only one bus or one type of bus exists.

The memory 2002 is configured to store application program code for executing the solution of the present invention, where the application program code for executing the solution of the present invention is stored in the memory, and is executed by the processor 2001.

The memory may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM), a flash memory, a hard disk drive (HDD), or a solid-state drive (SSD), or any other optical disc storage, an optical disc storage (including a compact disc, a laser disc, an optical disc, a digital versatile disc, a Blu-ray disc, or the like), a magnetic disk storage medium, or any other magnetic storage device, or any other medium that can be used to carry or store expected program code in a form of an instruction or a data structure and can be accessed by a computer. However, this is not limited. The memories are connected to the processor by the bus.

The processor 2001 may be a central processing unit (CPU), or a combination of a CPU and a hardware chip.

The hardware chip may be a network processor (NP), an application-specific integrated circuit (ASIC), a programmable logic device (PLD), or any combination thereof.

The PLD may be a complex programmable logic device (CPLD), a field-programmable gate array (FPGA), generic array logic (GAL), or any combination thereof.

The processor 2001 is configured to invoke the program code in the memory 2002. In a possible implementation, when the application program is executed by the processor 2001, the following functions are implemented.

When the user equipment 20 is connected to a first base station, the processor 2001 is configured to establish a first substream with a communication peer, where the first substream is a substream established by the user equipment 20 with the communication peer by using a first Internet Protocol IP address, the first IP address is an IP address allocated by a first gateway to the user equipment 20, and the first gateway is connected to the first base station.

When the user equipment 20 moves from the first base station to a second base station, the processor 2001 is further configured to obtain a second IP address when a second gateway and the first gateway are not the same gateway, where the second base station is connected to the second gateway, and the second IP address is an IP address allocated by the second gateway to the user equipment 20.

The processor 2001 is further configured to establish a second substream with the communication peer, where the second substream is a substream established by the user equipment 20 with the communication peer by using the second IP address.

The processor 2001 is further configured to remove the first substream after establishing the second substream.

Optionally, the user equipment 20 further includes the transmitter 2005 and the receiver 2004, where when the user equipment 20 is connected to the first base station, the receiver 2004 is configured to receive a first gateway identity sent by the first base station, where the first gateway identity is used to indicate the first gateway;

when the user equipment 20 moves from the first base station to the second base station, the receiver 2004 is further configured to receive a second gateway identity sent by the second base station, where the second gateway identity is used to indicate the second gateway;

the processor 2001 is further configured to determine whether the second gateway identity is the same as the first gateway identity, and if the second gateway identity is different from the first gateway identity, generate an IP address obtaining request message;

the transmitter 2005 is configured to send the IP address obtaining request message to the second gateway; and the receiver 2004 is further configured to receive the second IP address sent by the second gateway.

Optionally, the user equipment 20 further includes the transmitter 2005 and the receiver 2004, where when the user equipment 20 moves from the first base station to the second base station, the transmitter 2005 is configured to send the first IP address or a first gateway identity to a second mobility management entity, so that the second mobility management entity determines, according to the first IP address or the first gateway identity, whether the second gateway and the first gateway are the same gateway and when the second gateway and the first gateway are not the same gateway, requests the second gateway to allocate the IP address to the user equipment 20 and sends the second IP address received from the second gateway to the user equipment 20, where the first gateway identity is used to indicate the first gateway, and the second mobility management entity is configured to manage the second base station and the second gateway; and the receiver 2004 is configured to receive the second IP address sent by the second mobility management entity.

Optionally, the user equipment 20 further includes the transmitter 2005 and the receiver 2004, where when the user equipment 20 moves from the first base station to the second base station, the transmitter 2005 is configured to send an identity of the second base station to the first base station, so that the first base station determines whether the second gateway and the first gateway are the same gateway, where the second gateway identity is used to indicate the second gateway;

the receiver 2004 is configured to receive a determining indication message sent by the first base station, where the determining indication message is used to indicate that the second gateway and the first gateway are not the same gateway;

the processor 2001 is further configured to generate an IP address obtaining request message;

the transmitter 2005 is further configured to send the IP address obtaining request message to the second gateway; and the receiver 2004 is further configured to receive the second IP address sent by the second gateway.

Optionally, the processor 2001 is further configured to control the user equipment 20 to enter idle mode after the user equipment 20 is connected to the second base station and completes a location update;

the receiver 2004 is further configured to receive paging of a first mobility management entity or a second mobility management entity when the user equipment 20 is in idle mode, where the first mobility management entity is configured to manage the first base station and the first gateway, and the second mobility management entity is configured to manage the second base station and the second gateway;

the processor 2001 is further configured to generate a paging response message;

the transmitter 2005 is configured to send the paging response message to the first mobility management entity or the second mobility management entity; and the receiver 2004 is further configured to receive downlink data forwarded by the first gateway.

Optionally, the processor 2001 is further configured to generate a network resource release indication message after removing the first substream; and the user equipment 20 further includes the transmitter 2005, configured to send the network resource release indication message to the first gateway through the second base station or a second mobility management entity, so that the first gateway releases a network resource occupied for transmitting the first substream, where the first mobility management entity is configured to manage the first base station and the first gateway.

Optionally, after removing the first substream, the processor 2001 is further configured to release a network resource occupied for transmitting the first substream, and generate an indication message indicating that the first substream is already removed; and the user equipment 20 further includes the transmitter 2005, configured to send, to the second base station, the indication message indicating that the first substream is already removed, so that the second base station releases a network resource occupied for transmitting the first substream.

When the user equipment provided by this embodiment of the present invention moves from the first gateway to the second gateway, the user equipment obtains an IP address, and establishes the second MPTCP substream with the communication peer by using an MPTCP technology and using the second IP address. Before the second MPTCP substream is established, the user equipment communicates with the communication peer by using the first MPTCP substream. After the second MPTCP substream is established, the first MPTCP substream is removed. Therefore, normal communication between the user equipment and the base station is ensured, and service continuity between the user equipment and the communication peer is ensured.

Figure 3:
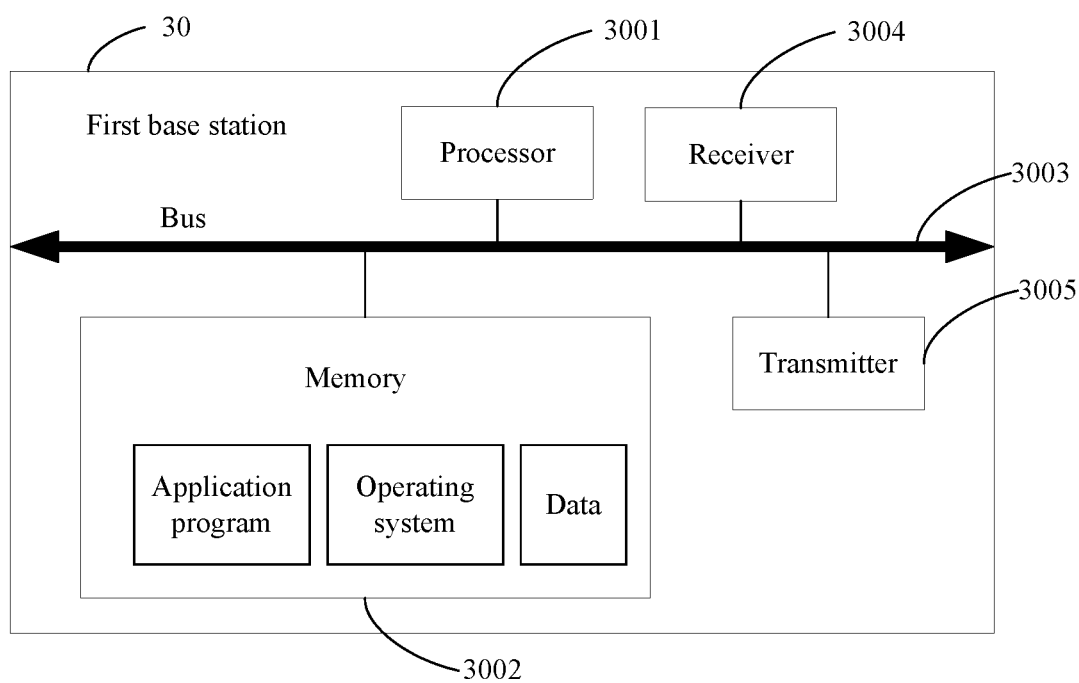
FIG. 3 is a schematic structural diagram of a first base station according to an embodiment of the present invention.

Referring to FIG. 3, an embodiment of the present invention provides a first base station 30, including a processor 3001, a memory 3002, and a bus 3003, where the processor 3001, the memory 3002, a receiver 3004, and a transmitter 3005 are interconnected by the bus 3003.

The bus 3003 may be an ISA bus, a PCI bus, an EISA bus, or the like. The bus 3003 may include an address bus, a data bus, a control bus, or the like. For ease of indicating, the bus in FIG. 2 is indicated by only a bold line. However, this does not mean that only one bus or one type of bus exists.

The memory 3002 is configured to store application program code for executing the solution of the present invention, where the application program code for executing the solution of the present invention is stored in the memory, and is executed by the processor 3001.

The memory may be a read-only memory ROM or another type of static storage device capable of storing static information and instructions, or a random access memory RAM or another type of dynamic storage device capable of storing information and instructions, or may be an electrically erasable programmable read-only memory EEPROM, a compact disc read-only memory CD-ROM, or any other optical disc storage, an optical disc storage (including a compact disc, a laser disc, an optical disc, a digital versatile disc, a Blu-ray disc, or the like), a magnetic disk storage medium, or any other magnetic storage device, or any other medium that can be used to carry or store expected program code in a form of an instruction or a data structure and can be accessed by a computer. However, this is not limited. The memories are connected to the processor by the bus.

The processor 3001 may be a central processing unit (CPU), or a combination of a CPU and a hardware chip.

The hardware chip may be a network processor (NP), an application-specific integrated circuit (ASIC), a programmable logic device (PLD), or any combination thereof.

The PLD may be a complex programmable logic device (CPLD), a field-programmable gate array (FPGA), generic array logic (GAL), or any combination thereof.

The processor 3001 is configured to invoke the program code in the memory 3002. In a possible implementation, when the application program is executed by the processor 3001, the following functions are implemented.

When user equipment moves from the first base station 30 to a second base station, and before a second substream is established, the processor 3001 is configured to generate a request message for establishing a data forwarding tunnel between the first base station 30 and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address, the first IP address is an IP address allocated by a first gateway to the user equipment, and the first gateway is connected to the first base station 30.

The transmitter 3005 is configured to send, to the second base station, the request message for establishing the data forwarding tunnel between the first base station 30 and the second base station.

The receiver 3004 is configured to receive a message sent by the second base station for acknowledging establishment of the data forwarding tunnel.

The receiver 3004 is further configured to receive a request message sent by the second base station for removing the data forwarding tunnel.

The transmitter 3005 is further configured to send a message for acknowledging removal of the data forwarding tunnel to the second base station.

The processor 3001 is further configured to remove the data forwarding tunnel.

Optionally, the data forwarding tunnel between the first base station 30 and the second base station includes:
  a downlink data forwarding tunnel or an uplink data forwarding tunnel; or
  a downlink data forwarding tunnel and an uplink data forwarding tunnel.

Optionally, the receiver 3004 is further configured to receive a network resource release indication message sent by the user equipment; and
  the transmitter 3005 is further configured to forward the indication message to the first gateway, so that the first gateway releases a network resource occupied for transmitting the first substream.

Optionally, the receiver 3004 is further configured to obtain an identity of the second base station;
  the processor 3001 is further configured to determine whether the identity of the second base station belongs to a base station identity list stored in the first base station 30, and when the identity of the second base station does not belong to the base station identity list stored in the first base station 30, generate a determining indication message, where the determining indication message is used to indicate that the second gateway and the first gateway are not the same gateway; and
  the transmitter 3005 is further configured to send the determining indication message to the user equipment, so that the user equipment requests to obtain the second IP address from the second gateway.

The first base station provided by this embodiment of the present invention determines, when the user equipment moves from the first gateway to the second gateway, that the second gateway and the first gateway are not the same gateway, and establishes the data forwarding tunnel with the second base station before the second MPTCP substream is established, where the data forwarding tunnel is used to transmit the data of the first MPTCP substream. Therefore, normal communication between the user equipment and the base station is ensured, and service continuity between the user equipment and the communication peer is ensured.

Figure 4:
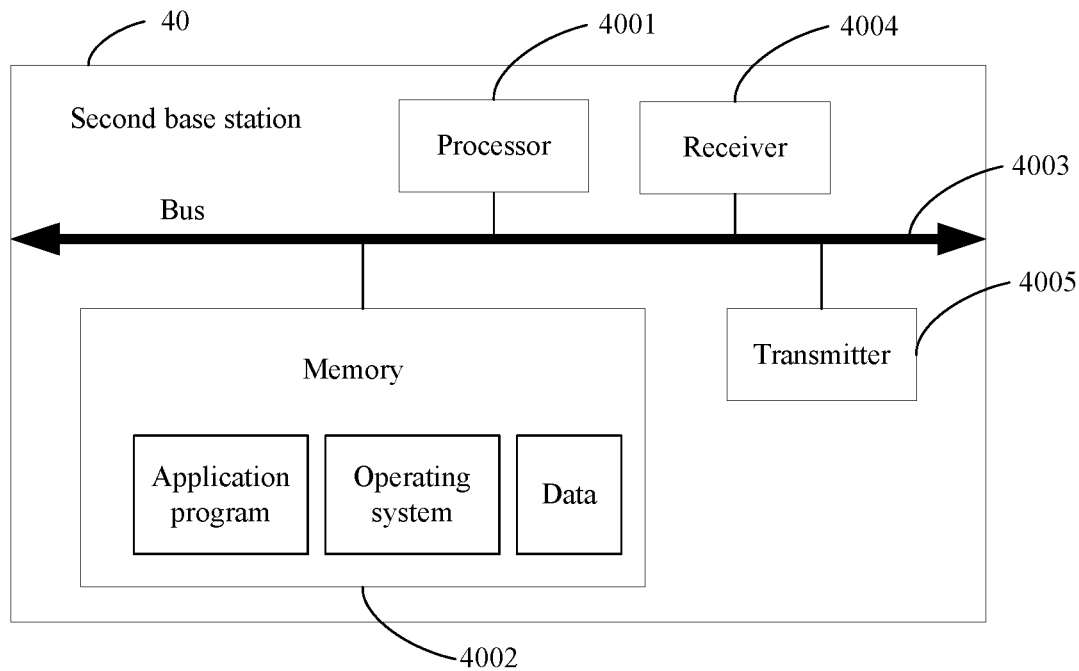
FIG. 4 is a schematic structural diagram of a second base station according to an embodiment of the present invention.

Referring to FIG. 4, an embodiment of the present invention provides a second base station 40, including a processor 4001, a memory 4002, and a bus 4003, where the processor 4001, the memory 4002, a receiver 4004, and a transmitter 4005 are interconnected by the bus 4003.

The bus 4003 may be an ISA bus, a PCI bus, an EISA bus, or the like. The bus 4003 may include an address bus, a data bus, a control bus, or the like. For ease of indicating, the bus in FIG. 2 is indicated by only a bold line. However, this does not mean that only one bus or one type of bus exists.

The memory 4002 is configured to store application program code for executing the solution of the present invention, where the application program code for executing the solution of the present invention is stored in the memory, and is executed by the processor 4001.

The memory may be a read-only memory ROM or another type of static storage device capable of storing static information and instructions, or a random access memory RAM or another type of dynamic storage device capable of storing information and instructions, or may be an electrically erasable programmable read-only memory EEPROM, a compact disc read-only memory CD-ROM, or any other optical disc storage, an optical disc storage (including a compact disc, a laser disc, an optical disc, a digital versatile disc, a Blu-ray disc, or the like), a magnetic disk storage medium, or any other magnetic storage device, or any other medium that can be used to carry or store expected program code in a form of an instruction or a data structure and can be accessed by a computer. However, this is not limited. The memories are connected to the processor by the bus.

The processor 4001 may be a CPU, or a combination of a CPU and a hardware chip.

The hardware chip may be a NP, an ASIC, a PLD, or any combination thereof.

The PLD may be a CPLD, a FPGA, GAL, or any combination thereof.

The processor 4001 is configured to invoke the program code in the memory 4002. In a possible implementation, when the application program is executed by the processor 4001, the following functions are implemented.

When user equipment moves from a first base station to the second base station, and before a second substream is established, the receiver 4004 is configured to receive a request message sent by the first base station for establishing a data forwarding tunnel between the first base station and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address before the user equipment is handed over from the first base station to the second base station, the first IP address is an IP address allocated by a first gateway to the user equipment, and the first gateway is connected to the first base station.

The processor 4001 is configured to generate a message for acknowledging establishment of the data forwarding tunnel.

The transmitter 4005 is configured to send, to the first base station, the message for acknowledging establishment of the data forwarding tunnel.

The processor 4001 is further configured to generate a request message for removing the data forwarding tunnel after the first substream is removed.

The transmitter 4005 is further configured to send, to the first base station, the request message for removing the data forwarding tunnel.

The receiver 4004 is further configured to receive a message sent by the first base station for acknowledging removal of the data forwarding tunnel.

The processor 4001 is further configured to remove the data forwarding tunnel.

Optionally, the data forwarding tunnel between the first base station and the second base station includes:
a downlink data forwarding tunnel or an uplink data forwarding tunnel; or
a downlink data forwarding tunnel and an uplink data forwarding tunnel.

Optionally, the receiver 4004 is further configured to receive uplink data sent by the user equipment;
the processor 4001 is further configured to identify data of the first substream based on a source address of the uplink data of the user equipment or a bearer corresponding to the first substream; and
the transmitter 4005 is further configured to forward the data of the first substream to the first base station through the data forwarding tunnel.

Optionally, the receiver 4004 is further configured to:
receive downlink data of the user equipment through a data forwarding tunnel between the first gateway and the second base station; or
receive downlink data of the user equipment that is sent by the second gateway; or
receive downlink data of the user equipment that is sent by a first mobility entity, where the first mobility management entity is configured to manage the first base station and the first gateway; or
receive downlink data of the user equipment that is sent by a second mobility entity, where the second mobility management entity is configured to manage the second base station and the second gateway.

The second base station provided by this embodiment of the present invention establishes, when the user equipment moves from the first gateway to the second gateway and before the second MPTCP substream is established, the data forwarding tunnel with the first base station, where the data forwarding tunnel is used to transmit the data of the first MPTCP substream. Therefore, normal communication between the user equipment and the base station is ensured, and service continuity between the user equipment and the communication peer is ensured.

Figure 5:
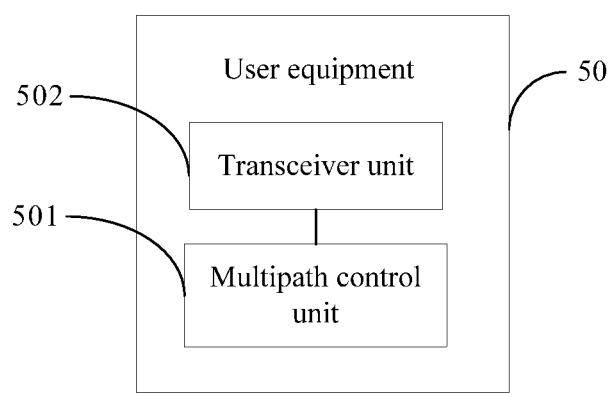
FIG. 5 is a schematic structural diagram of another user equipment according to an embodiment of the present invention.

Referring to FIG. 5, an embodiment of the present invention provides another user equipment 50, including a multipath control unit 501 and a transceiver unit 502.

When the user equipment 50 is connected to a first base station, the multipath control unit 501 is configured to establish a first substream with a communication peer, where the first substream is a substream established by the user equipment 50 with the communication peer by using a first Internet Protocol IP address, the first IP address is an IP address allocated by a first gateway to the user equipment 50, and the first gateway is connected to the first base station.

When the user equipment 50 moves from the first base station to a second base station, the multipath control unit 501 is configured to obtain a second IP address when a second gateway and the first gateway are not the same gateway, where the second base station is connected to the second gateway, and the second IP address is an IP address allocated by the second gateway to the user equipment 50.

The multipath control unit 501 is further configured to establish a second substream with the communication peer, where the second substream is a substream established by the user equipment 50 with the communication peer by using the second IP address.

The multipath control unit 501 is further configured to remove the first substream after establishing the second substream.

Optionally, the transceiver unit 502 is further configured to: when the user equipment 50 is connected to the first base station, receive a first gateway identity sent by the first base station, where the first gateway identity is used to indicate the first gateway; and when the user equipment 50 moves from the first base station to the second base station, receive a second gateway identity sent by the second base station, where the second gateway identity is used to indicate the second gateway;

the multipath control unit 501 is further configured to determine whether the second gateway identity is the same as the first gateway identity, and if the second gateway identity is different from the first gateway identity, generate an IP address obtaining request message; and the transceiver unit 502 is further configured to send the IP address obtaining request message to the second gateway, and receive the second IP address sent by the second gateway.

Optionally, when the user equipment 50 moves from the first base station to the second base station, the transceiver unit 502 is further configured to send the first IP address or a first gateway identity to a second mobility management entity, so that the second mobility management entity determines, according to the first IP address or the first gateway identity, whether the second gateway and the first gateway are the same gateway and when the second gateway and the first gateway are not the same gateway, requests the second gateway to allocate the IP address to the user equipment 50 and sends the second IP address received from the second gateway to the user equipment 50, where the first gateway identity is used to indicate the first gateway, and the second mobility management entity is configured to manage the second base station and the second gateway; and the transceiver unit 502 is further configured to receive the second IP address sent by the second mobility management entity.

Optionally, when the user equipment 50 moves from the first base station to the second base station, the transceiver unit 502 is further configured to send an identity of the second base station to the first base station, so that the first base station determines whether the second gateway and the first gateway are the same gateway, where the second gateway identity is used to indicate the second gateway;

the transceiver unit 502 is further configured to receive a determining indication message sent by the first base station, where the determining indication message is used to indicate that the second gateway and the first gateway are not the same gateway;

the multipath control unit 501 is further configured to generate an IP address obtaining request message; and the transceiver unit 502 is further configured to send the IP address obtaining request message to the second gateway, and receive the second IP address sent by the second gateway.

Optionally, the multipath control unit 501 is further configured to control the user equipment 50 to enter idle mode after the user equipment 50 is connected to the second base station and completes a location update;

the transceiver unit 502 is further configured to receive paging of a first mobility management entity or a second mobility management entity when the user equipment 50 is in idle mode, where the first mobility management entity is configured to manage the first base station and the first gateway, and the second mobility management entity is configured to manage the second base station and the second gateway;

the multipath control unit 501 is further configured to generate a paging response message;

the transceiver unit 502 is configured to send the paging response message to the first mobility management entity or the second mobility management entity; and the transceiver unit 502 is further configured to receive downlink data forwarded by the first gateway.

Optionally, the multipath control unit 501 is further configured to generate a network resource release indication message after removing the first substream; and the transceiver unit 502 is further configured to send the network resource release indication message to the first gateway through the second base station or a second mobility management entity, so that the first gateway releases a network resource occupied for transmitting the first substream, where the first mobility management entity is configured to manage the first base station and the first gateway.

Optionally, after removing the first substream, the multipath control unit 501 is further configured to release a network resource occupied for transmitting the first substream, and generate an indication message indicating that the first substream is already removed; and the transceiver unit 502 is further configured to send, to the second base station, the indication message indicating that the first substream is already removed, so that the second base station releases a network resource occupied for transmitting the first substream.

When the user equipment provided by this embodiment of the present invention moves from the first gateway to the second gateway, the user equipment obtains an IP address, and establishes the second MPTCP substream with the communication peer by using an MPTCP technology and using the second IP address. Before the second MPTCP substream is established, the user equipment communicates with the communication peer by using the first MPTCP substream. After the second MPTCP substream is established, the first MPTCP substream is removed. Therefore, normal communication between the user equipment and the base station is ensured, and service continuity between the user equipment and the communication peer is ensured.

Figure 6:
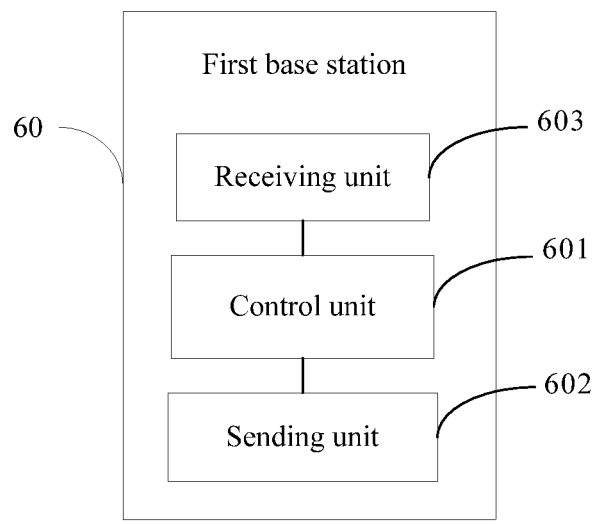
FIG. 6 is a schematic structural diagram of another first base station according to an embodiment of the present invention.
Figure 7:
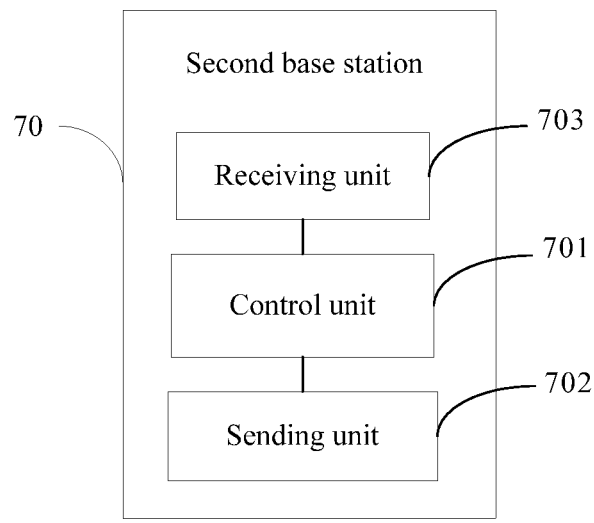
FIG. 7 is a schematic structural diagram of another second base station according to another embodiment of the present invention.

Referring to FIG. 6, an embodiment of the present invention provides another first base station 60, including a control unit 601, a sending unit 602, and a receiving unit 603.

When user equipment moves from the first base station 60 to a second base station, and before a second substream is established, the control unit 601 is configured to generate a request message for establishing a data forwarding tunnel between the first base station 60 and the second base station, where the second substream is a substream established by the user equipment with a communication peer by using a second Internet Protocol IP address, the second IP address is an IP address allocated by a second gateway to the user equipment, the second gateway is connected to the second base station, the data forwarding tunnel is used to transmit data of a first substream, the first substream is a substream established by the user equipment with the communication peer by using a first IP address, the first IP address is an IP address allocated by a first gateway to the user equipment, and the first gateway is connected to the first base station 60.

The sending unit 602 is configured to send, to the second base station, the request message for establishing the data forwarding tunnel between the first base station 60 and the second base station.

The receiving unit 603 is configured to receive a message sent by the second base station for acknowledging establishment of the data forwarding tunnel.

The receiving unit 603 is further configured to receive a request message sent by the second base station for removing the data forwarding tunnel.

The sending unit 602 is further configured to send a message for acknowledging removal of the data forwarding tunnel to the second base station.

The control unit 601 is further configured to remove the data forwarding tunnel.

Optionally, the data forwarding tunnel between the first base station 60 and the second base station includes:
 a downlink data forwarding tunnel or an uplink data forwarding tunnel; or
 a downlink data forwarding tunnel and an uplink data forwarding tunnel.

Optionally, the receiving unit 603 is further configured to receive a network resource release indication message sent by the user equipment; and
 the sending unit 602 is further configured to forward the indication message to the first gateway, so that the first gateway releases a network resource occupied for transmitting the first substream.

Optionally, the receiving unit 603 is further configured to obtain an identity of the second base station;
 the processing unit is further configured to determine whether the identity of the second base station belongs to a base station identity list stored in the first base station 60, and when the identity of the second base station does not belong to the base station identity list stored in the first base station 60, generate a determining indication message, where the determining indication message is used to indicate that the second gateway and the first gateway are not the same gateway; and
 the sending unit 602 is further configured to send the determining indication message to the user equipment, so that the user equipment requests to obtain the second IP address from the second gateway.

The first base station provided by this embodiment of the present invention determines, when the user equipment moves from the first gateway to the second gateway, that the second gateway and the first gateway are not the same gateway, and establishes the data forwarding tunnel with the second base station before the second MPTCP substream is established, where the data forwarding tunnel is used to transmit the data of the first MPTCP substream. Therefore, normal communication between the user equipment and the base station is ensured, and service continuity between the user equipment and the communication peer is ensured.

An embodiment of the present invention provides another second base station 70, including a control unit 701, a sending unit 702, and a receiving unit 703.

When user equipment moves from a first base station to the second base station 70, and before a second substream is established, the receiving unit 703 is configured to receive a request message sent by the first base station for establishing a data forwarding tunnel between the first base station and the second base station 70, where the second substream is a substream established by the user equipment with a communication peer by using a second Internet Protocol IP address, the second IP address is an IP address allocated by a second gateway to the user equipment, the second gateway is connected to the second base station 70, the data forwarding tunnel is used to transmit data of a first substream, the first substream is a substream established by the user equipment with the communication peer by using a first IP address before the user equipment is handed over from the first base station to the second base station 70, the first IP address is an IP address allocated by a first gateway to the user equipment, and the first gateway is connected to the first base station.

The control unit 701 is configured to generate a message for acknowledging establishment of the data forwarding tunnel.

The sending unit 702 is configured to send, to the first base station, the message for acknowledging establishment of the data forwarding tunnel.

The control unit 701 is further configured to generate a request message for removing the data forwarding tunnel after the first substream is removed.

The sending unit 702 is further configured to send, to the first base station, the request message for removing the data forwarding tunnel.

The receiving unit 703 is further configured to receive a message sent by the first base station for acknowledging removal of the data forwarding tunnel.

The control unit 701 is further configured to remove the data forwarding tunnel.

Optionally, the data forwarding tunnel between the first base station and the second base station 70 includes:
 a downlink data forwarding tunnel or an uplink data forwarding tunnel; or
 a downlink data forwarding tunnel and an uplink data forwarding tunnel.

Optionally, the receiving unit 703 is further configured to receive uplink data sent by the user equipment;
 the control unit 701 is further configured to identify data of the first substream based on a source address of the uplink data of the user equipment or a bearer corresponding to the first substream; and
 the sending unit 702 is further configured to forward the data of the first substream to the first base station through the data forwarding tunnel.

Optionally, the receiving unit 703 is further configured to:
 receive downlink data of the user equipment through a data forwarding tunnel between the first gateway and the second base station 70; or
  receive downlink data of the user equipment that is sent by the second gateway; or
  receive downlink data of the user equipment that is sent by a first mobility entity, where the first mobility management entity is configured to manage the first base station and the first gateway; or
  receive downlink data of the user equipment that is sent by a second mobility entity, where the second mobility management entity is configured to manage the second base station 70 and the second gateway.

The second base station provided by this embodiment of the present invention establishes, when the user equipment moves from the first gateway to the second gateway and before the second MPTCP substream is established, the data forwarding tunnel with the first base station, where the data forwarding tunnel is used to transmit the data of the first MPTCP substream. Therefore, normal communication between the user equipment and the base station is ensured, and service continuity between the user equipment and the communication peer is ensured.

Based on the embodiment corresponding to FIG. 1, an embodiment of the present invention provides a mobility management method, applied to a mobility management system in a cellular network. The mobility management system includes user equipment, a first base station, a second base station, a first gateway, a second gateway, and a communication peer.

The first base station is connected to the first gateway, and the second base station is connected to the second gateway. A connection between the first base station and the first gateway means that the first base station and the first gateway can directly communicate with each other. For example, the first gateway serves the first base station, and the first base station may be connected to more than one gateway. The first gateway may be connected to more than one base station, and the first gateway may be a gateway corresponding to an optimal route when the first base station communicates with the communication peer. Alternatively, the first base station and the first gateway belong to a same local network, and the first gateway is a gateway corresponding to the first base station and planned for the first base station according to a network plan.

Figure 8:
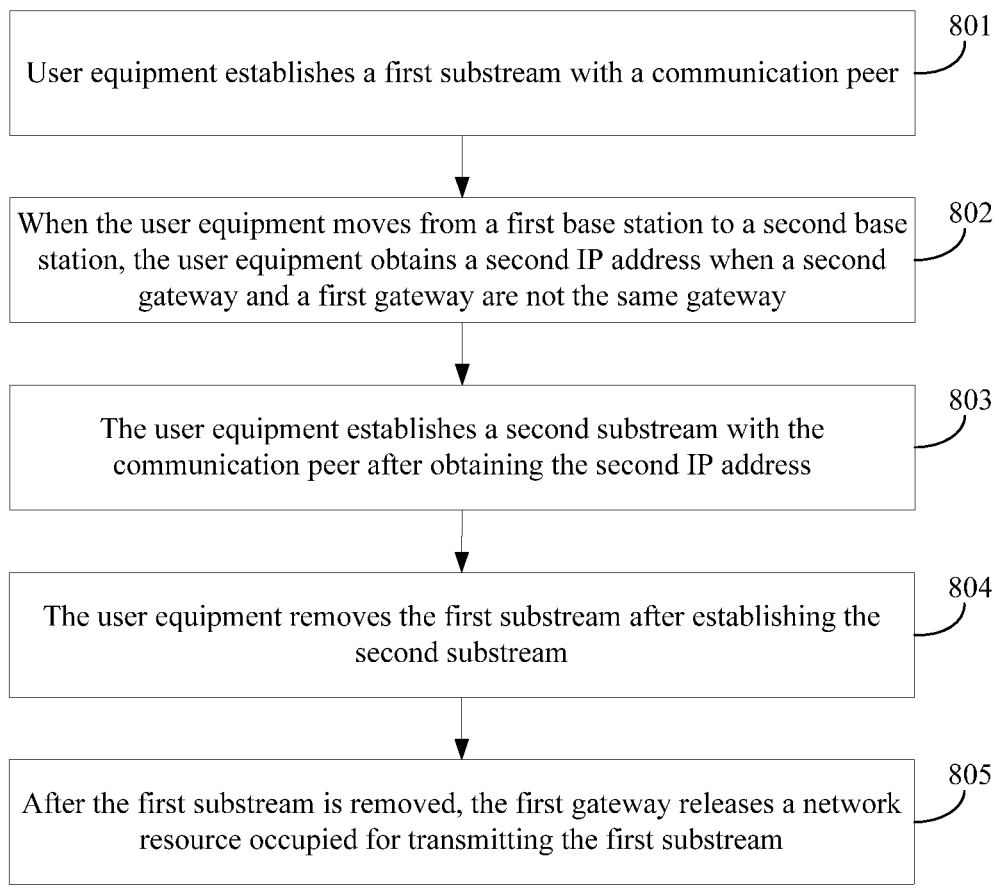
FIG. 8 is a schematic flowchart of a mobility management method according to an embodiment of the present invention.

When the user equipment establishes a TCP connection to the communication peer through the first gateway, the first gateway allocates an IP address to the user equipment, and the IP address allocated by the first gateway to the user equipment is a first IP address. When the user equipment moves from the first base station to the second base station, the second gateway does not manage the IP address allocated by the first gateway, and the user equipment cannot establish a TCP connection to the communication peer through the second gateway by using the IP address allocated by the first gateway. Therefore, the second gateway allocates a new IP address to the user equipment, so that the user equipment establishes a TCP connection to the communication peer by using the new IP address. The new IP address allocated by the second gateway to the user equipment is a second IP address. The TCP connection established by the user equipment to the communication peer by using the first IP address is a first substream, and the TCP connection established by the user equipment to the communication peer by using the second IP address is a second substream. In this embodiment, an application scenario in which an MPTCP substream is established by using an MPTCP technology is used as an example to describe the mobility management method. Certainly, the mobility management method provided by the present invention is also applicable to application scenarios in which a substream is established by using other technical means, for example, a substream is established by using an Multipath Real-time Transport Protocol (MPRTP) technology or an Multi-Connection Transmission Control Protocol (MCTCP) technology, or a plurality of substreams are implemented in other manners by using an application layer, a network layer, an extended transport layer, and protocol layers having similar functions. The specific technical means of establishing a substream is not limited in the present invention. Referring to FIG. 8, a mobility management method provided by an embodiment of the present invention includes the following steps:

801. User equipment establishes a first substream with a communication peer.

Optionally, the first substream may be a first MPTCP substream, and the first MPTCP substream is an MPTCP substream established by the user equipment with the communication peer by using a first Internet Protocol IP address. The first IP address is an IP address allocated by a first gateway to the user equipment. In an MPTCP technology, an MPTCP layer is added between a socket and a TCP layer in a TCP/IP protocol stack architecture, and the MPTCP layer is responsible for managing a plurality of TCP submodules. Two communication parties may establish TCP substream connections by using different IP address pairs, where each TCP substream is an MPTCP substream.

Optionally, the mobility management method provided by the present invention is described by using an LTE wireless cellular network as an example. The user equipment and the communication peer may be user terminals or servers supporting the MPTCP technology, or MPTCP proxies and servers, and the first gateway and a second gateway may be distributed local gateways. After accessing a first base station, the user equipment obtains the first IP address from the first gateway, and establishes the first MPTCP substream with the communication peer by using the first IP address and using the MPTCP technology.

Specifically, optionally, the user equipment may obtain the first IP address in two manners. In a first manner, the user equipment sends a Dynamic Host Configuration Protocol (DHCP) message to the first gateway to request the IP address from the first gateway, and the first gateway sends the first IP address to the user equipment by using a DHCP message. In a second manner, the user equipment sends a non access stratum (NAS) message to a first mobility management entity to request the IP address, and the first mobility management entity sends, to the user equipment by using a NAS message, the first IP address allocated by the first gateway to the user equipment. After obtaining the first IP address, the user equipment establishes the first MPTCP substream with the communication peer by using the MPTCP technology. Specifically, the user equipment sends a request for establishing the first MPTCP substream to the communication peer; after receiving the request for establishing the first MPTCP substream, the communication peer returns an acknowledgement message to the user equipment; and after receiving the acknowledgement message, the user equipment sends a message for acknowledging establishment of the first MPTCP substream to the communications terminal. In this way, establishment of the first MPTCP substream is completed.

802. When the user equipment moves from a first base station to a second base station, the user equipment obtains a second IP address when a second gateway and a first gateway are not the same gateway.

The second IP address is an IP address allocated by the second gateway to the user equipment. If the second gateway and the first gateway are not the same gateway, the user equipment needs to obtain a new IP address (the second IP address) from the second gateway, and communicate with the communication peer by using the second IP address allocated by the second gateway.

In a specific application scenario, the user equipment in idle mode moves from the first base station to the second base station, and obtains the second IP address. In this embodiment, three manners of obtaining the second IP address are illustrated.

In a first manner of obtaining the second IP address, when the user equipment is connected to the first base station, the user equipment receives a first gateway identity sent by the first base station, where the first gateway identity is used to indicate the first gateway. When the user equipment in idle mode moves from the first base station to the second base station and is connected to the second base station, the user equipment receives a second gateway identity sent by the second base station, where the second gateway identity is used to indicate the second gateway. The user equipment compares the second gateway identity and the first gateway identity. If the second gateway identity is different from the first gateway identity, the user equipment sends an IP address obtaining request message to the second gateway. The second gateway determines, according to a context record, whether an IP address is already allocated to the user equipment, and if an IP address is already allocated to the user equipment, rejects the request for obtaining a new IP address by the user equipment, and instructs the user equipment to use the IP address already allocated by the second gateway to the user equipment, or if the second gateway has not allocated an IP address to the user equipment, sends the second IP address to the user equipment, and the user equipment receives the second IP address sent by the second gateway. The process of obtaining the second IP address is completed.

Optionally, the first base station and the second base station may send their gateway identities to the user equipment by broadcast. The gateway identity may be a local network ID, or the gateway identity may be a local gateway ID. The IP address obtaining request message may be a DHCP request.

In a second manner of obtaining the second IP address, when the user equipment in idle mode moves from the first base station to the second base station, the user equipment sends a location update (TAU, Tracking Area Update) request message to a second mobility management entity, and sends the first IP address or a first gateway identity to the second mobility management entity. The second mobility management entity determines whether the first IP address is an IP address allocated by the second gateway to the user equipment, or whether the first gateway identity is the same as a second gateway identity. If the first IP address is not an IP address allocated by the second gateway to the user equipment, or the first gateway identity is different from the second gateway identity, the second mobility management entity determines that the first gateway and the second gateway are not the same gateway.

After determining that the first gateway and the second gateway are not the same gateway, the second mobility management entity determines, according to a context record, whether the second gateway has allocated an IP address to the user equipment, and if the second gateway has allocated an IP address to the user equipment, the second mobility management entity rejects the request for obtaining a new IP address by the user equipment, and instructs the user equipment to use the IP address already allocated by the second gateway to the user equipment.

If the second gateway has not allocated an IP address to the user equipment, the second mobility management entity instructs the user equipment to obtain a new IP address from the second gateway, or the second mobility management entity requests the second gateway to allocate an IP address to the user equipment, and sends the second IP address received from the second gateway to the user equipment.

Optionally, the second mobility management entity may send the second IP address to the user equipment by using a NAS message. Further optionally, the second mobility management entity sends a location update acknowledgement (TAU Accept) message including the second IP address to the user equipment, and the user equipment receives the second IP address sent by the second mobility management entity. The process of obtaining the second IP address is completed.

Optionally, after determining that the second gateway and the first gateway are not the same gateway, the second mobility management entity may also instruct the user equipment to request an IP address from the second gateway to complete the process of obtaining the second IP address.

Optionally, when the first gateway and the second gateway are connected to a same mobility management entity, the first mobility management entity and the second mobility management entity are the same mobility management entity.

In a third manner of obtaining the second IP address, when the user equipment in idle mode moves from the first base station to the second base station, the user equipment sends a TAU request message to a second mobility management entity through a second base station. After receiving the TAU request message, the second mobility management entity requests a context of the user equipment from a first mobility management entity by using a context request (Context Request) message, and further determines, according to the context of the user equipment, whether the gateway (the first gateway) connected to the first base station and the gateway (the second gateway) connected to the second base station are the same gateway.

For example, the second mobility management entity maintains a mapping table of correspondences between base stations and gateways, and when receiving the TAU request message, determines a base station corresponding to a current location of the user equipment, and determines, by querying the mapping table, a gateway connected to the base station.

The second mobility management entity determines, by querying the mapping table, the gateway (the second gateway) connected to the base station (the second base station) corresponding to the current location, and a gateway (the first gateway) connected to a base station (the first base station) corresponding to a location of the user equipment when a TAU request message is received last time, and further determines whether the first gateway and the second gateway are the same gateway.

Therefore, after sending the TAU, the user equipment does not need to further send the first IP address or a first gateway identity to the second mobility management entity, and the second mobility management entity can determine whether the first gateway and the second gateway are the same gateway.

When determining that the first gateway and the second gateway are not the same gateway, the second mobility management entity determines, according to a context record, whether the second gateway has allocated an IP address to the user equipment. If yes, the second mobility management entity instructs the user equipment to use the IP address already allocated by the second gateway to the user equipment. If no, the second mobility management entity instructs the user equipment to request to obtain a new IP address from the second gateway, or the second mobility management entity requests the second gateway to allocate an IP address to the user equipment, and sends the second IP address received from the second gateway to the user equipment by using a NAS message or a TAU accept message.

In addition, when the second mobility management entity sends a context request message to the first mobility management entity, the first mobility management entity may also determine, according to a prestored mapping table of correspondences between base stations and gateways, whether the first gateway and the second gateway are the same gateway, and further determine whether the user equipment needs to obtain a new IP address. A specific process is similar to the scenario of determining by the second mobility management entity, and is not further described.

Optionally, when the first gateway and the second gateway are connected to a same mobility management entity, the first mobility management entity and the second mobility management entity are the same mobility management entity.

803. The user equipment establishes a second substream with the communication peer after obtaining the second IP address.

The second MPTCP substream is an MPTCP substream established by the user equipment with the communication peer by using the second IP address. In the MPTCP technology, the MPTCP layer is added between the socket and the TCP layer in the TCP/IP protocol stack architecture, and the MPTCP layer is responsible for managing a plurality of TCP submodules, so that the user equipment and the communication peer may use different IP address pairs to establish one or more MPTCP substream connections. The user equipment sets an MPTCP option in a TCP message sent to the communication peer, and initiates a request for adding the second MPTCP substream. Specifically, the user equipment queries, by setting an MP_CAPABLE (multipath capable) flag, the communication peer whether the second MPTCP substream can be established, and after receiving an MP_CAPABLE ACK (acknowledgement) message returned by the communication peer, sends, to the communication peer by using the second IP address, a TCP message in which an MP_JOIN (Join Connection, join substream) indication is set. When the user equipment receives an MP_JOIN ACK message sent by the communication peer, establishment of the second MPTCP substream is completed.

804. The user equipment removes the first substream after establishing the second substream.

After the second MPTCP substream is established, the user equipment communicates with the communication peer by using the second MPTCP substream. Therefore, the user equipment removes the first MPTCP substream, and releases a network resource occupied for transmitting the first substream, including the first IP address, the context, or the like.

Optionally, the user equipment may send a TCP message carrying a REMOVE_ADDR (remove address) option to the communication peer by using the second MPTCP substream, and send a request for removing the first MPTCP substream to the communication peer, where the REMOVE_ADDR option includes the first IP address.

Alternatively, the user equipment sends, to the communication peer by using the first MPTCP substream, a TCP message in which an F bit of a data sequence signal (DSS) identifier is 1, where the F bit of the DSS identifier is a DATA_FIN bit, and the DATA_FIN bit that is set to 1 represents completion of data transmission and requesting to remove the first MPTCP substream.

Alternatively, the user equipment sends, to the communication peer by using the first MPTCP substream, a TCP message carrying an MP_FASTCLOSE (multipath fastclose) option, requesting to remove the first MPTCP substream.

805. After the first substream is removed, the first gateway releases a network resource occupied for transmitting the first substream.

After the first MPTCP substream is removed, the first gateway is instructed to release the network resource occupied for transmitting the first substream, including releasing the first IP address, deleting the context of the user equipment, or the like.

Specifically, the user equipment may instruct the second base station or the second mobility management entity to send a network resource release indication message to the first gateway.

The user equipment does not occupy the first IP address any longer, and instructs the first gateway to release the first IP address, that is, unbind the first IP address from the user equipment. After releasing the first IP address, the first gateway may allocate the first IP address to other user equipment.

Optionally, after removing the first MPTCP substream, the user equipment releases an Radio Resource Connection (RRC) and the first IP address, and enters the idle mode.

In the mobility management method provided by this embodiment of the present invention, an IP address is dynamically allocated to the user equipment by the first gateway and the second gateway. In the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. In the mobility management method provided by this embodiment of the present invention, when the user equipment moves from the first gateway to the second gateway, the user equipment establishes the second MPTCP substream with the communication peer by using the MPTCP technology and using the second IP address. Before the second MPTCP substream is established, the user equipment communicates with the communication peer by using the first MPTCP substream. After the second MPTCP substream is established, the first MPTCP substream is removed. Therefore, normal communication between the user equipment and the base station is ensured, and service continuity between the user equipment and the communication peer is ensured.

Based on the embodiment corresponding to FIG. 8, an embodiment of the present invention provides another mobility management method, applied to a mobility management system in a cellular network. In the embodiment corresponding to FIG. 8, the user equipment in idle mode moves from the first base station to the second base station, and obtains the second IP address after being connected to the second base station. In this embodiment, user equipment in idle mode moves from a first base station to a second base station, and enters the idle mode after being connected to the second base station. The user equipment obtains a second IP address only when the user equipment initiates a service request or when downlink data needs to be sent to the user equipment. Some steps in this embodiment are the same as corresponding steps in the embodiment corresponding to FIG. 8. Herein same content is not further described in detail. Specific steps are as follows:

901. User equipment establishes a first substream with a communication peer.

902. When the user equipment moves from a first base station to a second base station, the user equipment obtains a second IP address when a second gateway and a first gateway are not the same gateway.

In a specific application scenario, the user equipment in idle mode moves from the first base station to the second base station. With reference to step 802 in the embodiment corresponding to FIG. 8, after moving to the second base station, the user equipment sends a location update request message to a second mobility management entity through the second base station. The second mobility management entity determines whether the first gateway and the second gateway are the same gateway, and determines whether a new IP address needs to be allocated to the user equipment.

If a new IP address needs to be allocated to the user equipment, the second mobility management entity does not request an IP address for the user equipment temporally, but only sends a location update acknowledgement (TAU Accept) message to the user equipment. After receiving the location update acknowledgement message, the user equipment enters the idle mode. The second IP address is allocated to the user equipment only when the user equipment initiates a service request or when downlink data needs to be sent to the user equipment.

Optionally, after the user equipment enters the idle mode, the user equipment may obtain the second IP address in three manners.

In a first manner of obtaining the second IP address, the user equipment sends a service request to the second base station; the second base station forwards the service request to the second mobility management entity; the second mobility management entity requests an IP address from the second gateway for the user equipment, and sends the second IP address received from the second gateway to the user equipment; and the user equipment receives the second IP address. The process of obtaining the second IP address is completed.

In a second manner of obtaining the second IP address, a first mobility management entity and the second mobility management entity are the same mobility management entity, that is, the second mobility management entity manages the first gateway, the first base station, the second gateway, and the second base station simultaneously. After receiving downlink data sent by the communication peer to the user equipment, the first gateway caches the downlink data, and sends a downlink data notification (DDN) to the second mobility management entity. After receiving the downlink data notification, the second mobility management entity pages (Page) the user equipment.

In an application scenario, the second mobility management entity forwards the downlink data to the user equipment. Specifically, after the user equipment responds to the paging of the second mobility management entity, the second mobility management entity requests a new IP address from the second gateway for the user equipment, and sends the second IP address received from the second gateway to the user equipment by using a NAS message. In addition, the second mobility management entity requests, from the first gateway, the downlink data cached by the first gateway, and sends, to the user equipment by using a NAS message, the downlink data received from the first gateway. Optionally, the second mobility management entity may send the second IP address and the downlink data to the user equipment simultaneously.

Alternatively, in another application scenario, the first gateway sends the downlink data to the user equipment through a downlink data forwarding tunnel. Specifically, after the user equipment responds to the paging of the second mobility management entity, the second mobility management entity requests a new IP address from the second gateway for the user equipment, and sends the second IP address received from the second gateway to the user equipment by using a NAS message. In addition, the second mobility management entity establishes a downlink data forwarding tunnel, so that the first gateway sends the downlink data to the user equipment through the downlink data forwarding tunnel. Optionally, the downlink data forwarding tunnel may be a data forwarding tunnel between the first gateway and the second gateway. In this case, the first gateway sends the downlink data to the second gateway through the downlink data forwarding tunnel, and the second gateway sends the downlink data to the user equipment through the second base station. Alternatively, the downlink data forwarding tunnel may be a data forwarding tunnel between the first gateway and the second base station. In this case, the first gateway sends the downlink data to the second base station through the data forwarding tunnel, and the second base station sends the downlink data to the user equipment.

In a third manner of obtaining the second IP address, a first mobility management entity and the second mobility management entity are two mobility management entities; the first mobility management entity manages the first gateway and the first base station, and the second mobility management entity manages the second gateway and the second base station. In this case, after sending the location update acknowledgement message to the user equipment, the second mobility management entity registers a downlink data notification of the user equipment with the first mobility management entity, requesting the first mobility management entity to forward, to the second mobility management entity, the downlink data notification sent by the first gateway.

After acknowledging registration of the second mobility management entity, if the first mobility management entity receives the downlink data notification sent by the first gateway, the first mobility management entity sends the downlink data notification of the user equipment to the second mobility management entity. After receiving the downlink data notification, the second mobility management entity pages the user equipment.

In an application scenario, the second mobility management entity forwards downlink data to the user equipment. Specifically, after the user equipment responds to the paging of the first mobility management entity, the second mobility management entity requests a new IP address from the second gateway for the user equipment, and sends the second IP address received from the second gateway to the user equipment by using a NAS message. In addition, the second mobility management entity requests the downlink data from the first gateway through the first mobility management entity. After receiving the downlink data sent by the first gateway through the first mobility management entity, the second mobility management entity sends the downlink data to the user equipment by using a NAS message. Optionally, the second mobility management entity may send the second IP address and the downlink data to the user equipment simultaneously.

Alternatively, in another application scenario, the first gateway sends downlink data to the user equipment through a downlink data forwarding tunnel. Specifically, after the user equipment responds to the paging of the second mobility management entity, the second mobility management entity requests a new IP address from the second gateway for the user equipment, and sends the second IP address received from the second gateway to the user equipment by using a NAS message. In addition, the second mobility management entity establishes a downlink data forwarding tunnel through the first mobility management entity, so that the first gateway sends the cached downlink data to the user equipment through the downlink data forwarding tunnel.

Optionally, the downlink data forwarding tunnel may be a data forwarding tunnel between the first gateway and the second gateway. In this case, the first gateway sends the downlink data to the second gateway through the downlink data forwarding tunnel, and the second gateway sends the downlink data to the user equipment through the second base station. Alternatively, the downlink data forwarding tunnel may be a data forwarding tunnel between the first gateway and the second base station. In this case, the first gateway sends the downlink data to the second base station through the data forwarding tunnel, and the second base station sends the downlink data to the user equipment.

903. The user equipment establishes a second substream with the communication peer after obtaining the second IP address.

904. The user equipment removes the first substream after establishing the second substream.

With reference to step 804 in the embodiment corresponding to FIG. 8, after the second MPTCP substream is established, the user equipment sends data to the communication peer by using the second MPTCP substream, and no longer sends data to the communication peer by using the first MPTCP substream. Therefore, the user equipment removes the first MPTCP substream, and releases a network resource occupied for transmitting the first substream, including the first IP address and a context.

905. After the first substream is removed, the first gateway releases a network resource occupied for transmitting the first substream.

After the first MPTCP substream is removed, the user equipment indicates, to the first mobility management entity, that the first MPTCP substream is already removed. After the first mobility management entity forwards the downlink data to the user equipment, if no new downlink data notification of the user equipment is received after a preset timer expires, the first mobility management entity instructs the first gateway to release the network resource occupied for transmitting the first substream, including releasing the first IP address, removing the downlink data forwarding tunnel, deleting a context (Context) of the user equipment, or the like.

In the mobility management method provided by this embodiment of the present invention, an IP address is dynamically allocated to the user equipment by the first gateway and the second gateway. In the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. In the mobility management method provided by this embodiment of the present invention, when the user equipment moves from the first gateway to the second gateway, the user equipment establishes the second MPTCP substream with the communication peer by using an MPTCP technology and using the second IP address. Before the second MPTCP substream is established, the user equipment communicates with the communication peer by using the first MPTCP substream, and transmits the downlink data of the user equipment through the downlink data forwarding tunnel. After the second MPTCP substream is established, the first MPTCP substream is removed. Therefore, normal communication between the user equipment and the base station is ensured, and service continuity between the user equipment and the communication peer is ensured.

Based on the embodiment corresponding to FIG. 8, an embodiment of the present invention provides still another mobility management method, applied to a mobility management system in a cellular network. In the embodiment corresponding to FIG. 8, the user equipment in idle mode moves from the first base station to the second base station, and obtains the second IP address after being connected to the second base station. In this embodiment, before moving from a first base station to a second base station, user equipment is communicating with a communication peer by using a first MPTCP substream; and when the user equipment is handed over from the first base station to the second base station in the process of communicating with the communication peer, it needs to be ensured that a service connection of the user equipment is not broken. Some steps in this embodiment are the same as corresponding steps in the embodiment corresponding to FIG. 8. Herein same content is not further described in detail. Specific steps are as follows:

100-1. User equipment establishes a first substream with a communication peer.

100-2. When the user equipment moves from a first base station to a second base station, the user equipment obtains a second IP address when a second gateway and a first gateway are not the same gateway.

In a specific application scenario, the user equipment is handed over from the first base station to the second base station in the process of communicating with the communication peer (connected mode), and the second gateway and the first gateway are not the same gateway. In this case, a data forwarding tunnel is established between the first base station and the second base station. When obtaining the second IP address, the user equipment continues to keep communication with the communication peer by using the data forwarding tunnel, that is, transmit data of the first MPTCP substream through the data forwarding tunnel. Therefore, a service interruption problem is avoided in the handover process.

The data forwarding tunnel may include one or both of a downlink data forwarding tunnel and an uplink data forwarding tunnel. Herein, the process of establishing the data forwarding tunnel and the process of transmitting the data of the first MPTCP substream through the data forwarding tunnel are described, assuming that the data forwarding tunnel includes the downlink data forwarding tunnel and the uplink data forwarding tunnel.

Optionally, this embodiment provides two manners of establishing the data forwarding tunnel.

In a first manner of establishing the data forwarding tunnel, the data forwarding tunnel is established through an X2 interface handover. Specifically, the first base station sends an IP address and a tunnel endpoint identifier (TEID) of the uplink data forwarding tunnel to the second base station by using a handover request message. After receiving the handover request message, the second base station sends an IP address and a TEID of the downlink data forwarding tunnel to the first base station by using a handover request Ack (handover request acknowledgement) message. In this way, the data forwarding tunnel is established.

In a second manner of establishing the data forwarding tunnel, the data forwarding tunnel is established through an S1 interface handover. Specifically, the first base station sends an IP address and a TEID of the uplink data forwarding tunnel to a first mobility management entity by using a handover required (handover inquired) message; the first mobility management entity forwards the IP address and the TEID to a second mobility management entity; and the second mobility management entity sends the IP address and the TEID of the uplink data forwarding tunnel to the second base station by using a handover request message. After receiving the handover request message, the second base station returns a handover request Ack message to the first base station. In this way, the data forwarding tunnel is established.

After the data forwarding tunnel is established, the data of the first MPTCP substream is transmitted between the user equipment and the communication peer through the data forwarding tunnel. The data of the first MPTCP substream includes downlink data of the first MPTCP substream and uplink data of the first MPTCP substream. The downlink data of the first MPTCP substream is data whose destination address is the first IP address. The uplink data of the first MPTCP substream is data sent by the user equipment to the communication peer.

With respect to the downlink data of the user equipment, after receiving the downlink data of the first MPTCP substream, the first base station sends the downlink data of the first MPTCP substream to the second base station through the data forwarding tunnel, and the second base station sends the downlink data of the first MPTCP substream to the user equipment.

With respect to the uplink data of the user equipment, the second base station needs to forward the first MPTCP substream and a second MPTCP substream separately based on different routes after receiving the uplink data sent by the user equipment.

Optionally, the second base station forwards the data of the first substream based on a source address of the uplink data of the user equipment. For example, the second base station obtains the second IP address. For the uplink data of the first MPTCP substream, the second base station sends a data packet whose source address is not the second IP address, as an uplink data packet of the first MPTCP substream to the first base station through the data forwarding tunnel, and the first base station sends the data packet to the communication peer.

With reference to step 802 in the embodiment corresponding to FIG. 8, in this embodiment, two optional solutions to obtaining the second IP address by the user equipment and the second base station are provided, and separately applied to a scenario in which the user equipment obtains the second IP address by using a DHCP message, and a scenario in which the second mobility management entity requests the second gateway to allocate an IP address to the user equipment.

In the scenario in which the user equipment obtains the second IP address by using a DHCP message, the user equipment may determine whether the second IP address needs to be obtained.

Specifically, the user equipment receives a first gateway identity and a second gateway identity, determines that the first gateway and the second gateway are not the same gateway, and requests a new IP address from the second gateway, thereby obtaining the second IP address.

Alternatively, the first base station determines whether the user equipment needs to obtain the second IP address. In an application scenario, the user equipment sends the second gateway identity to the first base station; the first base station determines the second gateway identity and the first gateway identity; and if the second gateway identity is different from the first gateway identity, the first base station sends a determining indication message to the user equipment, where the determining indication message is used to indicate that the second gateway and the first gateway are not the same gateway. In another application scenario, the first base station stores a base station identity list, where the base station identity list includes identities of base stations connected to the first gateway. When the user equipment moves from the first base station to the second base station, the user equipment requests to be handed over to the second base station. The first base station obtains the identity of the second base station from the handover request message of the user equipment, and determines whether the identity of the second base station belongs to the base station identity list.

If yes, it indicates that both the second base station and the first base station are connected to the first gateway, and the user equipment does not need to obtain the second IP address.

If no, it indicates that the first gateway and the gateway (the second gateway) connected to the second base station are not the same gateway, and the user equipment needs to obtain the second IP address. In this case, the first base station sends a determining indication message to the user equipment, where the determining indication message is used to indicate that the second gateway and the first gateway are not the same gateway.

After receiving the determining indication message, the user equipment sends a DHCP message to the second gateway, requesting to obtain the second IP address.

The first base station may directly send the determining indication message to the user equipment. For example, after the first base station instructs, by using a handover command message, the user equipment to enter a service area of the second base station, the user equipment requests a new IP address from the second gateway, thereby obtaining the second IP address.

Alternatively, the first base station instructs the second base station to send the determining indication message to the user equipment. For example, the first base station notifies, by using a handover request, the second base station that the user equipment needs to obtain a new IP address. After the user equipment enters a service area of the second base station, the second base station instructs the user equipment to request a new IP address from the second gateway.

After obtaining the second IP address, the user equipment sends the second IP address to the second base station by using an RRC message, or the user equipment sends the second IP address to the second mobility management entity by using a NAS message, and the second mobility management entity sends the second IP address to the second base station by using an S1 message. In this way, the process of obtaining the second IP address by the user equipment and the second base station is completed. The second base station sends a data packet that is sent by the user equipment and whose source address is the first IP address to the first base station through the data forwarding tunnel, and the first base station sends the data packet to the communication peer.

In the scenario in which the second mobility management entity requests the second gateway to allocate an IP address to the user equipment, the mobility management entity may determine whether the user equipment needs to obtain the second IP address, or the first base station determines whether the user equipment needs to obtain the second IP address. The following describes the two determining manners separately.

In a first determining manner, the handover required message sent by the first base station to the first mobility management entity includes the identity of the second base station, and the first mobility management entity determines, according to a mapping table between base stations and gateways, whether the user equipment needs to obtain a new IP address. Alternatively, the first mobility management entity forwards the identity of the second base station to the second mobility management entity by using a forward relocation request message, and the second mobility management entity determines whether the user equipment needs to obtain a new IP address.

Optionally, when the first base station and the second base station are connected to a same mobility management entity, the first mobility management entity and the first mobility management entity are the same mobility management entity.

Herein the determining by the second mobility management entity is used as an example for description. After determining that the first gateway and the second gateway are not the same gateway, the second mobility management entity requests a new IP address from the second gateway for the user equipment, sends the second IP address received from the second gateway to the user equipment by using a NAS message, and sends the second IP address to the second base station by using an S1 message. In this way, the process of obtaining the second IP address by the user equipment and the second base station is completed.

Certainly, after determining that the first gateway and the second gateway are not the same gateway, the second mobility management entity may also instruct the user equipment to obtain the second IP address by using a DHCP message. Details are not further described herein.

In a second determining manner, with reference to the descriptions about obtaining the second IP address by the user equipment by using the DHCP message, the first base station performs determining according to the second gateway identity and the first gateway identity received from the user equipment or according to the stored base station identity list; when determining that the user equipment needs to obtain a new IP address, the first base station may directly send a determining indication message to the second mobility management entity, or instruct the second base station, by using a handover message, to send a determining indication message to the second mobility management entity, indicating that the second gateway and the first gateway are not the same gateway. After receiving the determining indication message, the second mobility management entity requests to obtain the second IP address from the second gateway, and sends the second IP address to the user equipment.

After obtaining the second IP address, the user equipment sends the second IP address to the second base station by using an RRC message, or the user equipment sends the second IP address to the second mobility management entity by using a NAS message, and the second mobility management entity sends the second IP address to the second base station by using an S1 message.

After receiving the uplink data sent by the user equipment, the second base station forwards the uplink data based on the source address. Specifically, if the source address of the data packet is the second IP address, the data packet is sent to the second gateway. If the source address of the data packet is not the second IP address, the data packet is sent to the first base station through the data forwarding tunnel, and is sent by the first base station to the communication peer.

Optionally, the second base station forwards the data of the first substream based on a bearer corresponding to the first substream. For example, in the scenario in which the second mobility management entity requests the second gateway to allocate an IP address to the user equipment, the user equipment sends the first IP address or the first gateway identity to the second mobility management entity; the second mobility management entity determines that the first gateway and the second gateway are not the same gateway; and then the second mobility management entity requests a new IP address from the second gateway for the user equipment. When sending the second IP address to the second mobility management entity, the second gateway requests, by using a create bearer request message, the second mobility management entity to create a bearer between the user equipment and the second base station. After the bearer is created, the second mobility management entity binds the created bearer with the second IP address, and sends the created bearer and the second IP address to the user equipment by using a NAS message. In this way, the process of obtaining the second IP address by the user equipment is completed. When the user equipment sends the uplink data, the user equipment sends, by using the created bearer, a data packet whose source address is the second IP address, and sends, by using an existing bearer, a data packet whose source address is the first IP address. The second base station sends, to the first base station through the data forwarding tunnel, the data packet sent by the user equipment by using the existing bearer, and the first base station sends the data packet to the communication peer. The second base station sends, to the second gateway, the data packet sent by the user equipment by using the created bearer.

100-3. The user equipment establishes a second substream with the communication peer after obtaining the second IP address.

100-4. The user equipment removes the first substream after establishing the second substream.

With reference to step 804 in the embodiment corresponding to FIG. 8, after the second MPTCP substream is established, the user equipment sends data to the communication peer by using the second MPTCP substream, and no longer sends data to the communication peer by using the first MPTCP substream. Therefore, the user equipment removes the first MPTCP substream, and releases a network resource occupied for transmitting the first substream, including the first IP address and a context.

100-5. After the first substream is removed, the first gateway releases a network resource occupied for transmitting the first substream.

After the first MPTCP is removed, the user equipment instructs, through the second mobility management entity, the first gateway to release the network resource occupied for transmitting the first substream; in addition, the user equipment instructs the second base station to remove the data forwarding tunnel with the first base station.

Corresponding to the two manners of establishing the data forwarding tunnel, there are also two processes of removing the data forwarding tunnel.

Specifically, in a scenario in which the data forwarding tunnel is established through an X2 interface handover, the user equipment indicates, to the second base station by using an RRC message, that the first MPTCP substream is already removed, or the user equipment indicates, to the second mobility management entity by using a NAS message, that the first MPTCP substream is already removed, and the second mobility management entity indicates, to the second base station, that the first MPTCP substream is already removed. After the second base station receives the indication that the first MPTCP substream is already removed, the second base station sends a request message for removing the data forwarding tunnel to the first base station. After receiving the request message for removing the data forwarding tunnel, the first base station returns a message for acknowledging removal of the data forwarding tunnel to the second base station. The first base station and the second base station release the data forwarding tunnel, and the first base station deletes the context of the user equipment and releases access network resources.

Alternatively, in a scenario in which the data forwarding tunnel is established through an S1 interface handover, the user equipment indicates, to the second base station by using an RRC message, that the first MPTCP substream is already removed, or the user equipment indicates, to the second mobility management entity by using a NAS message, that the first MPTCP substream is already removed, and the second mobility management entity indicates, to the second base station, that the first MPTCP substream is already removed. After receiving the indication that the first MPTCP substream is already removed, the second base station sends an indication message to the first mobility management entity through the second mobility management entity. The second mobility management entity instructs the second gateway to release the data forwarding tunnel; the first mobility management entity instructs the first gateway and the first base station to release the data forwarding tunnel; and the first base station deletes the context of the user equipment and releases access network resources.

Based on the mobility management system provided by the embodiment of the present invention, an embodiment of the present invention further provides a method for charging user equipment. When the user equipment communicates with a communication peer by using a first substream, a first gateway charges the user equipment; and when the user equipment communicates with the communication peer by using a second substream, a second gateway charges the user equipment. In this embodiment, an application scenario in which the first gateway charges the user equipment is used as an example for description.

In an application scenario in which a charging rules function (PCRF, Policy and Charging Rules Function) and an online charging system (OCS) are used, the first gateway obtains a charging rule of the user equipment and an available quota of the user equipment, reduces the available quota of the user equipment according to the charging rule of the user equipment, and then sends a balance of the available quota of the user equipment to the online charging system. The available quota of the user equipment is an available quota in an account of the user equipment, and the available quota may be a credit or a quota of the user equipment.

Specifically, optionally, when the user equipment is connected to the first gateway, the user equipment requests the charging rule of the user equipment and the available quota of the user equipment from a first mobility management entity. The first mobility management entity obtains the charging rule of the user equipment from the policy and charging rules function, and sends the charging rule to the first gateway. The first mobility management entity obtains the balance of the available quota of the user equipment from the online charging system, and sends the balance of the available quota to the first gateway. The first gateway reduces the available quota of the user equipment according to the charging rule of the user equipment. If the available quota of the user equipment is used up, the first gateway requests an available quota of the user equipment again from the first mobility management entity. After the first substream is removed, the first gateway returns the balance of the available quota of the user equipment to the online charging system through the mobility management entity.

In an application scenario in which a charging rules function and an OFCS, are used, the first gateway sends a call detail record (CDR) of the user equipment on the first gateway to a first mobility management entity. The first mobility management entity sends the call detail record of the user equipment on the first gateway to the offline charging system. Optionally, the first mobility management entity may manage a plurality of gateways, and the first gateway may be one or more of the gateways managed by the first mobility management entity.

In the mobility management method provided by this embodiment of the present invention, an IP address is dynamically allocated to the user equipment by the first gateway and the second gateway. In the prior art, an anchor device in data convergence mode in a mobile network architecture centrally allocates an IP address to user equipment, and the anchor device has heavy pressure. If the anchor device is faulty, normal running of a whole service network is affected, and consequently, a service of the user equipment is interrupted. In the mobility management method provided by this embodiment of the present invention, when the user equipment is handed over from the first gateway to the second gateway, the user equipment establishes the second MPTCP substream with the communication peer by using an MPTCP technology and using the second IP address. Before the second MPTCP substream is established, the user equipment communicates with the communication peer by using the first MPTCP substream, and receives the downlink data and sends the uplink data through the data forwarding tunnel. After the second MPTCP substream is established, the first MPTCP substream is removed. Therefore, normal communication between the user equipment and the base station is ensured, and service continuity between the user equipment and the communication peer is ensured.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM, a ROM, an EEPROM, a CD-ROM or other optical disk storage, a disk storage medium or other disk storage, or any other medium that can be used to carry or store expected program code in a command or data structure form and can be accessed by a computer.

In addition, any connection may be appropriately defined as a computer-readable medium. For example, if software is transmitted from a website, a server or another remote source by using a coaxial cable, an optical fiber/cable, a twisted pair, a digital subscriber line (DSL), or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobility management system, comprising:
   a first gateway;
   a second gateway;
   a first base station connected to the first gateway;
   a second base station connected to the second gateway;
   a communication peer; and
   user equipment configured to:
      establish a first substream with the communication peer by using a first Internet Protocol (IP) address allocated by the first gateway to the user equipment;
      when moving from the first base station to the second base station, obtain a second IP address allocated by the second gateway to the user equipment;
      establish with the communication peer after obtaining the second IP address a second substream by using the second IP address; and
      remove the first substream after establishing the second substream; and, wherein
   the mobility management system further comprises a second mobility management entity, wherein the second mobility management entity is configured to manage the second base station and the second gateway, and wherein obtaining the second IP address comprises:
   when the second mobility management entity determines, according to a context of the user equipment, that the second gateway and the first gateway are not the same gateway, the second mobility management entity requests the second gateway to allocate the IP address to the user equipment, and sends the second IP address received from the second gateway to the user equipment.

2. The system according to claim 1, wherein the user equipment moves from the first base station to the second base station when the user equipment is in an idle mode or in a connected mode being handed over from the first base station to the second base station.

3. The system according to claim 1, wherein obtaining the second IP address comprises:
   when the user equipment is connected to the first base station, the user equipment receiving a first gateway identity sent by the first base station, wherein the first gateway identity is used to indicate the first gateway;
   when the user equipment moves from the first base station to the second base station, the user equipment receiving a second gateway identity sent by the second base station, wherein the second gateway identity is used to indicate the second gateway; and
   if the second gateway identity is different from the first gateway identity, the user equipment sends an IP address obtaining request message to the second gateway, and receives the second IP address sent by the second gateway.

4. The system according to claim 1, wherein the mobility management system further comprises a second mobility management entity, wherein the second mobility management entity is configured to manage the second base station and the second gateway, and wherein obtaining the second IP address comprises:
   when the user equipment moves from the first base station to the second base station, the user equipment sends the first IP address or a first gateway identity to the second mobility management entity, wherein the first gateway identity is used to indicate the first gateway;
   the second mobility management entity determines whether the first IP address is the IP address allocated by the second gateway to the user equipment, or whether the first gateway identity is the same as a second gateway identity, wherein the second gateway identity is used to indicate the second gateway; and
   when the first IP address is not the IP address allocated by the second gateway to the user equipment or the first gateway identity is different from the second gateway identity, the second mobility management entity requests the second gateway to allocate the IP address to the user equipment, and sends the second IP address received from the second gateway to the user equipment.

5. The system according to claim 1, wherein the mobility management system further comprises a second mobility management entity, wherein the second mobility management entity is configured to manage the second base station, and the second gateway, and wherein
   obtaining the second IP address comprises:
   when the user equipment moves from the first base station to the second base station, the first base station is further configured to obtain an identity of the second base station;
   when determining that the identity of the second base station does not belong to a base station identity list stored in the first base station, the first base station sends a determining indication message to the second mobility management entity, wherein the base station identity list comprises identities of base stations connected to the first gateway, and the determining indication message is used to indicate that the second gateway and the first gateway are not the same gateway; and
   after receiving the determining indication message, the second mobility management entity requests the second gateway to allocate the IP address to the user equipment, and sends the second IP address received from the second gateway to the user equipment.

6. The system according to claim 1, wherein obtaining the second IP address comprises:
   when the user equipment moves from the first base station to the second base station, the first base station is further configured to obtain an identity of the second base station;
   when determining that the identity of the second base station does not belong to a base station identity list stored in the first base station, the first base station sends a determining indication message to the user equipment, wherein the base station identity list comprises identities of base stations connected to the first gateway, and the determining indication message is used to indicate that the second gateway and the first gateway are not the same gateway; and after receiving the determining indication message, the user equipment sends an IP address obtaining request message to the second gateway, and receives the second IP address sent by the second gateway.

7. The system according to claim 1, wherein the first base station or the second base station is configured to establish a data forwarding tunnel between the first base station and the second base station; and the user equipment and the communication peer are further configured to transmit data of the first substream through the data forwarding tunnel.

8. The system according to claim 7, wherein the data forwarding tunnel comprises one or more of the following:

a downlink data forwarding tunnel or an uplink data forwarding tunnel; and the second base station is further configured to forward data of the first substream based on a source address of uplink data of the user equipment or a bearer corresponding to the first sub stream.

9. The system according to claim 1, wherein the user equipment in idle mode moves from the first base station to the second base station, and after being connected to the second base station and completing a location update, enters the idle mode, and wherein the second mobility management entity is configured to manage the first base station, the first gateway, the second base station, and the second gateway, and wherein the first gateway is further configured to send a downlink data notification of the user equipment to the second mobility management entity after the user equipment enters the idle mode;

the second mobility management entity is further configured to receive the downlink data notification of the user equipment from the first gateway, and after receiving the downlink data notification of the user equipment, page the user equipment; and the user equipment is further configured to respond to the paging of the second mobility management entity.

10. The system according to claim 9, wherein the first gateway is further configured to cache downlink data;

after the user equipment responds to the paging, the second mobility management entity is further configured to establish a data forwarding tunnel between the first gateway and the second gateway, or establish a data forwarding tunnel between the first gateway and the second base station; and the first gateway is further configured to send the downlink data to the user equipment through the data forwarding tunnel.

11. The system according to claim 1, wherein the user equipment in idle mode moves from the first base station to the second base station, and after being connected to the second base station and completing a location update, enters the idle mode;

the mobility management system further comprises a first mobility management entity, wherein the first mobility management entity is configured to manage the first base station and the first gateway, and the second mobility management entity is configured to manage the second base station and the second gateway;

the first gateway is further configured to send the downlink data notification of the user equipment to the first mobility management entity after the user equipment enters the idle mode;

the first mobility management entity is further configured to send the downlink data notification of the user equipment to the second mobility management entity after acknowledging registration of the second mobility management entity;

the second mobility management entity is further configured to page the user equipment after receiving the downlink data notification of the user equipment; and the user equipment is further configured to respond to the paging of the second mobility management entity.

12. User equipment, comprising:

a processor;

a memory; and a bus, wherein the processor and the memory are interconnected by the bus, wherein when the user equipment is connected to a first base station, the processor is configured to establish with a communication peer a first substream by using a first Internet Protocol (IP) address allocated by a first gateway to the user equipment, and the first gateway is connected to the first base station;

when the user equipment moves from the first base station to a second base station, the processor is further configured to obtain a second IP address when a second gateway is different than the first gateway, wherein the second base station is connected to the second gateway, and the second IP address is an IP address allocated by the second gateway to the user equipment;

the processor is further configured to establish a second substream with the communication peer, wherein the second substream is established by the user equipment with the communication peer by using the second IP address; and the processor is further configured to remove the first substream after establishing the second substream; and, wherein the user equipment further comprises a transmitter and a receiver, wherein when the user equipment moves from the first base station to the second base station, the transmitter is configured to send the first IP address or a first gateway identity to a second mobility management entity, so that the second mobility management entity:

determines, according to the first IP address or the first gateway identity, whether the second gateway and the first gateway are the same gateway and when the second gateway is different than the first gateway, requests the second gateway to allocate the IP address to the user equipment and sends the second IP address received from the second gateway to the user equipment, wherein the first gateway identity is used to indicate the first gateway, and the second mobility management entity is configured to manage the second base station and the second gateway; and the receiver is configured to receive the second IP address sent by the second mobility management entity.

13. The user equipment according to claim 12, wherein the user equipment further comprises a transmitter and a receiver, wherein when the user equipment is connected to the first base station, the receiver is configured to receive a first gateway identity sent by the first base station, wherein the first gateway identity is used to indicate the first gateway;

when the user equipment moves from the first base station to the second base station, the receiver is further configured to receive a second gateway identity sent by the second base station, wherein the second gateway identity is used to indicate the second gateway;

the processor is further configured to determine whether the second gateway identity is the same as the first gateway identity, and if the second gateway identity is different from the first gateway identity, generate an IP address obtaining request message;

the transmitter is configured to send the IP address obtaining request message to the second gateway; and the receiver is further configured to receive the second IP address sent by the second gateway.

14. The user equipment according to claim 12, wherein the user equipment further comprises a transmitter and a receiver, wherein when the user equipment moves from the first base station to the second base station, the transmitter is configured to send an identity of the second base station to the first base station, so that the first base station determines whether the second gateway and the first gateway are the same gateway, wherein the second gateway identity is used to indicate the second gateway;

the receiver is configured to receive a determining indication message sent by the first base station, wherein the determining indication message is used to indicate that the second gateway is different than the first gateway;

the processor is further configured to generate an IP address obtaining request message;

the transmitter is further configured to send the IP address obtaining request message to the second gateway; and the receiver is further configured to receive the second IP address sent by the second gateway.

15. The user equipment according to claim 12, wherein the user equipment further comprises a transmitter and a receiver, wherein the processor is further configured to control the user equipment to enter idle mode after the user equipment is connected to the second base station and completes a location update;

the receiver is configured to receive paging of a first mobility management entity or a second mobility management entity when the user equipment is in idle mode, wherein the first mobility management entity is configured to manage the first base station and the first gateway, and the second mobility management entity is configured to manage the second base station and the second gateway;

the processor is further configured to generate a paging response message;

the transmitter is configured to send the paging response message to the first mobility management entity or the second mobility management entity; and the receiver is further configured to receive downlink data forwarded by the first gateway.

16. The user equipment according to claim 12, wherein the processor is further configured to generate a network resource release indication message after removing the first substream; and the user equipment further comprises a transmitter, configured to send the network resource release indication message to the first gateway through the second base station or a second mobility management entity, so that the first gateway releases a network resource occupied for transmitting the first substream, wherein a first mobility management entity is configured to manage the first base station and the first gateway.

17. The user equipment according to claim 12, wherein after removing the first substream, the processor is further configured to release a network resource occupied for transmitting the first substream, and generate an indication message indicating that the first substream is already removed; and the user equipment further comprises a transmitter, configured to send, to the second base station, the indication message indicating that the first substream is already removed, so that the second base station releases a network resource occupied for transmitting the first substream.

18. A mobility management method, applied to user equipment, wherein the method comprises:

when the user equipment is connected to a first base station, establishing, by the user equipment, a first substream with a communication peer, wherein the first substream is established by the user equipment with the communication peer by using a first Internet Protocol (IP) address, the first IP address is allocated by a first gateway to the user equipment, and the first gateway is connected to the first base station;

when the user equipment moves from the first base station to a second base station, obtaining, by the user equipment, a second IP address when a second gateway is different than the first gateway, wherein the second base station is connected to the second gateway, and the second IP address is an IP address allocated by the second gateway to the user equipment;

establishing, by the user equipment, a second substream with the communication peer, wherein the second substream is established by the user equipment with the communication peer by using the second IP address; and after establishing the second substream, removing, by the user equipment, the first substream; and, wherein the method further comprises:

when the user equipment moves from the first base station to the second base station:

sending the first IP address or a first gateway identity to a second mobility management entity, so that the second mobility management entity:

determines, according to the first IP address or the first gateway identity, whether the second gateway and the first gateway are the same gateway and when the second gateway is different than the first gateway, requests the second gateway to allocate the IP address to the user equipment, and sends the second IP address received from the second gateway to the user equipment, wherein the first gateway identity is used to indicate the first gateway, and the second mobility management entity is configured to manage the second base station and the second gateway; and receiving the second IP address sent by the second mobility management entity.

* * * * *